US011424449B2

(12) United States Patent
Rempel et al.

(10) Patent No.: US 11,424,449 B2
(45) Date of Patent: Aug. 23, 2022

(54) STABLE CATHODE MATERIALS

(71) Applicant: CAMX Power LLC, Lexington, MA (US)

(72) Inventors: Jane Rempel, Arlington, MA (US); David Ofer, Needham, MA (US); Jennifer A. Nelson, Waltham, MA (US); Adrian Pullen, Boston, MA (US); Kenan Sahin, Lexington, MA (US); Suresh Sriramulu, Arlington, MA (US)

(73) Assignee: CAMX Power LLC, Lexington, MA (US)

(*) Notice: Subject to any disclaimer, the term of this patent is extended or adjusted under 35 U.S.C. 154(b) by 0 days.

(21) Appl. No.: 16/728,379

(22) Filed: Dec. 27, 2019

(65) Prior Publication Data

US 2020/0243859 A1 Jul. 30, 2020

Related U.S. Application Data

(60) Provisional application No. 62/796,950, filed on Jan. 25, 2019.

(51) Int. Cl.
*H01M 4/52* (2010.01)
*H01M 4/36* (2006.01)
(Continued)

(52) U.S. Cl.
CPC ........... *H01M 4/525* (2013.01); *H01M 4/366* (2013.01); *H01M 10/0525* (2013.01); *H01M 2004/028* (2013.01)

(58) Field of Classification Search
CPC ....... H01M 10/0525; H01M 2004/028; H01M 4/525; H01M 4/366
See application file for complete search history.

(56) References Cited

U.S. PATENT DOCUMENTS 6,921,609 B2 7/2005 Lampe-Onnerud et al.
7,381,496 B2 6/2008 Onnerud et al.
(Continued)

FOREIGN PATENT DOCUMENTS

CN 101071857 A 11/2007
CN 107591519 * 1/2018 ............. H01M 4/36
(Continued)

OTHER PUBLICATIONS

Lim, et al., Advanced functional Materials, 2015; vol. 25, pp. 4673-4680. Year: 2015.
(Continued)

*Primary Examiner* — Maria Laios
*Assistant Examiner* — Angela J Martin
(74) *Attorney, Agent, or Firm* — Dinsmore & Shohl LLP; Weston R. Gould

(57) ABSTRACT

Provided are electrochemically active particles suitable for use as an active material in a cathode of a lithium ion electrochemical cell that include: a plurality of crystallites comprising a first composition comprising lithium, nickel, and oxygen; and a grain boundary between adjacent crystallites of the plurality of crystallites and comprising a second composition comprising lithium, nickel, and oxygen; wherein the grain boundary has a higher electrochemical affinity for lithium than the crystallites. The higher electrochemical affinity for Li leads to increased Li retention in the grain boundaries during or at charge relative to the bulk crystallites and stabilizes the structure of the grain boundaries and crystallites for improved cycling stability with no appreciable loss in capacity.

20 Claims, 16 Drawing Sheets

151
152
200kV x10.0k ZC
3.00μm

(51) Int. Cl.

| | |
|---|---|
| ***H01M 10/05*** | (2010.01) |
| ***H01M 4/525*** | (2010.01) |
| ***H01M 10/0525*** | (2010.01) |
| *H01M 4/02* | (2006.01) |

(56) References Cited

U.S. PATENT DOCUMENTS

| | | | | |
|---|---|---|---|---|
| 8,790,827 | B2 | 7/2014 | Yanagihara et al. | |
| 9,209,455 | B2 * | 12/2015 | Ofer | C01D 15/02 |
| 9,391,317 | B2 | 7/2016 | Ofer et al. | |
| 10,501,335 | B1 * | 12/2019 | Pullen | C01G 53/66 |
| 10,700,386 | B2 * | 6/2020 | Ofer | H01M 4/661 |
| 10,950,857 | B2 * | 3/2021 | Pullen | H01M 4/525 |
| 2005/0181280 | A1 | 8/2005 | Ceder et al. | |
| 2005/0188128 | A1 | 8/2005 | Koshiba | |
| 2008/0131782 | A1 | 6/2008 | Hagiwara et al. | |
| 2009/0104530 | A1 | 4/2009 | Shizuka et al. | |
| 2009/0121179 | A1 | 5/2009 | Shi | |
| 2012/0009474 | A1 | 1/2012 | Yanagihara et al. | |
| 2012/0028134 | A1 * | 2/2012 | Kim | H01M 10/052 429/342 |
| 2013/0304375 | A1 | 11/2013 | Lee et al. | |
| 2014/0197357 | A1 * | 7/2014 | Ofer | H01M 4/364 252/182.1 |
| 2014/0302615 | A1 * | 10/2014 | Park | H01M 4/525 436/163 |
| 2015/0079471 | A1 | 3/2015 | Fang et al. | |
| 2015/0188134 | A1 | 7/2015 | Kameyama et al. | |
| 2016/0181611 | A1 | 6/2016 | Cho et al. | |
| 2018/0013145 | A1 | 1/2018 | Choi et al. | |
| 2018/0040889 | A1 | 2/2018 | Choi et al. | |
| 2018/0040890 | A1 | 2/2018 | Choi et al. | |
| 2018/0040891 | A1 | 2/2018 | Choi et al. | |
| 2018/0040896 | A1 | 2/2018 | Choi et al. | |
| 2018/0115022 | A1 * | 4/2018 | Ofer | H01M 4/0435 |
| 2018/0337401 | A1 | 11/2018 | Ni et al. | |
| 2019/0355983 | A1 | 11/2019 | Zhang et al. | |
| 2019/0356015 | A1 | 11/2019 | Zhang et al. | |
| 2019/0372109 | A1 * | 12/2019 | Moon | H01M 10/0525 |

FOREIGN PATENT DOCUMENTS

| | | | | |
|---|---|---|---|---|
| CN | 107591519 A | | 1/2018 | |
| EP | 2023426 A1 | | 2/2009 | |
| EP | 3306713 A1 | | 4/2018 | |
| JP | 2000-340226 | * | 12/2000 | H01M 4/58 |
| JP | 2000-340226 A | | 12/2000 | |
| JP | 2008234872 A | | 10/2008 | |
| JP | 5002872 B2 | | 8/2012 | |
| JP | 2014-220232 A | | 11/2014 | |
| JP | 2015213038 A | | 11/2015 | |
| KR | 1020100099668 | | 9/2010 | |
| KR | 10-2016-0074236 A | | 6/2016 | |
| KR | 20190003110 A | | 1/2019 | |
| WO | 2002103824 | | 12/2002 | |
| WO | 2005114768 | | 12/2005 | |

OTHER PUBLICATIONS

Zuo, et al., Journal of Alloys and compounds, 2017; vol. 706, pp. 24-40. Year: 2017.

Kim, et al., Nano Letters, 2015; vol. 15, pp. 2111-2119. Year: 2015.

Moses, et al., Applied Surface Science, 2007; vol. 253, No. 10, pp. 4782-4791. Year: 2007.

Li, et al., Journal of Alloys and Compounds, 2008; vol. 457, pp. L1-L5. Year: 2008.

Lin, et al., Nature Communications, 2014; vol. 5, No. 3529, pp. 1-9. Year: 2014.

Kim, et al., Energy Environ. Sci., 2018; vol. 11, pp. 1449-1459. Year: 2018.

Lee, et al., Journal of Power Sources, 2015; vol. 273, pp. 663-669. Year 2015.

Jo, et al., Nano Research, 2015; vol. 8, No. 5, pp. 1464-1479. Year: 2015.

Zheng, et al., Journal of the Electrochemical Society, 2011; vol. 158, pp. A357-A362. Year: 2011.

Wantanabe, et al., Journal of Power Sources, 2014; vol. 258, pp. 210-217. Year: 2014.

Kim, et al., Electrochemical and Solid State Letters, 2006; vol. 9, No. 1, pp. A19-A23. Year: 2006.

Yan, et al., Nature Communications, 2017; vol. 8, No. 14101, pp. 1-9. Year: 2017.

Kim, et al., Journal of Power Sources, 2006; vol. 159, pp. 1328-1333. Year: 2006.

Kim, et al., Advanced Materials, 2016; 28:4705-4712. Year: 2016.

K. Lee and K. Kim, Journal of the electrochemical Society, 2000; vol. 145, No. 5, pp. 1709-1717. Year: 2000.

Yang, et al., Journal of Power sources, 2016; vol. 331, pp. 487-494. Year: 2016.

U.S. Appl. No. 16/250,762.

* cited by examiner

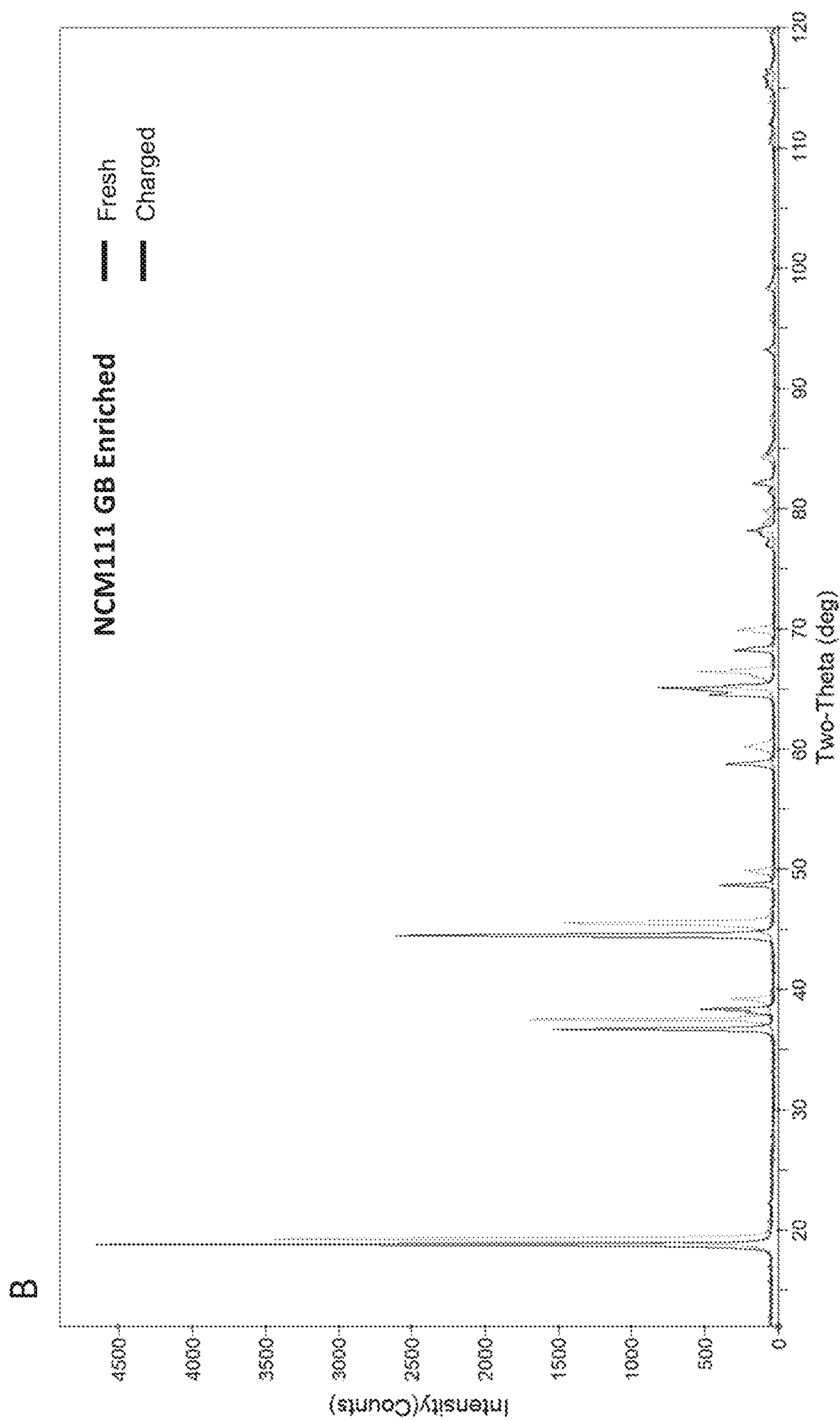
FIG. 5, cont.

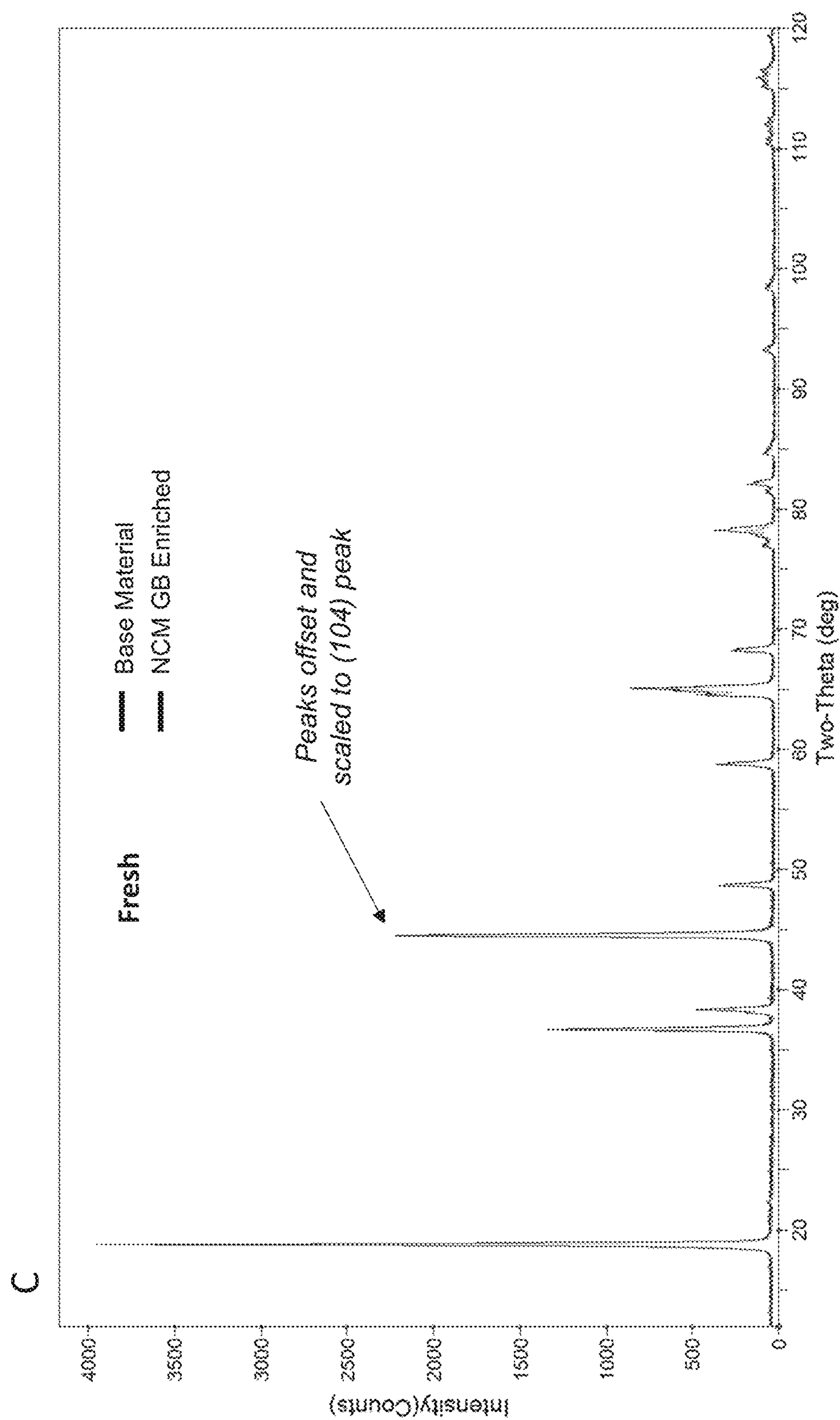
FIG. 5, cont.

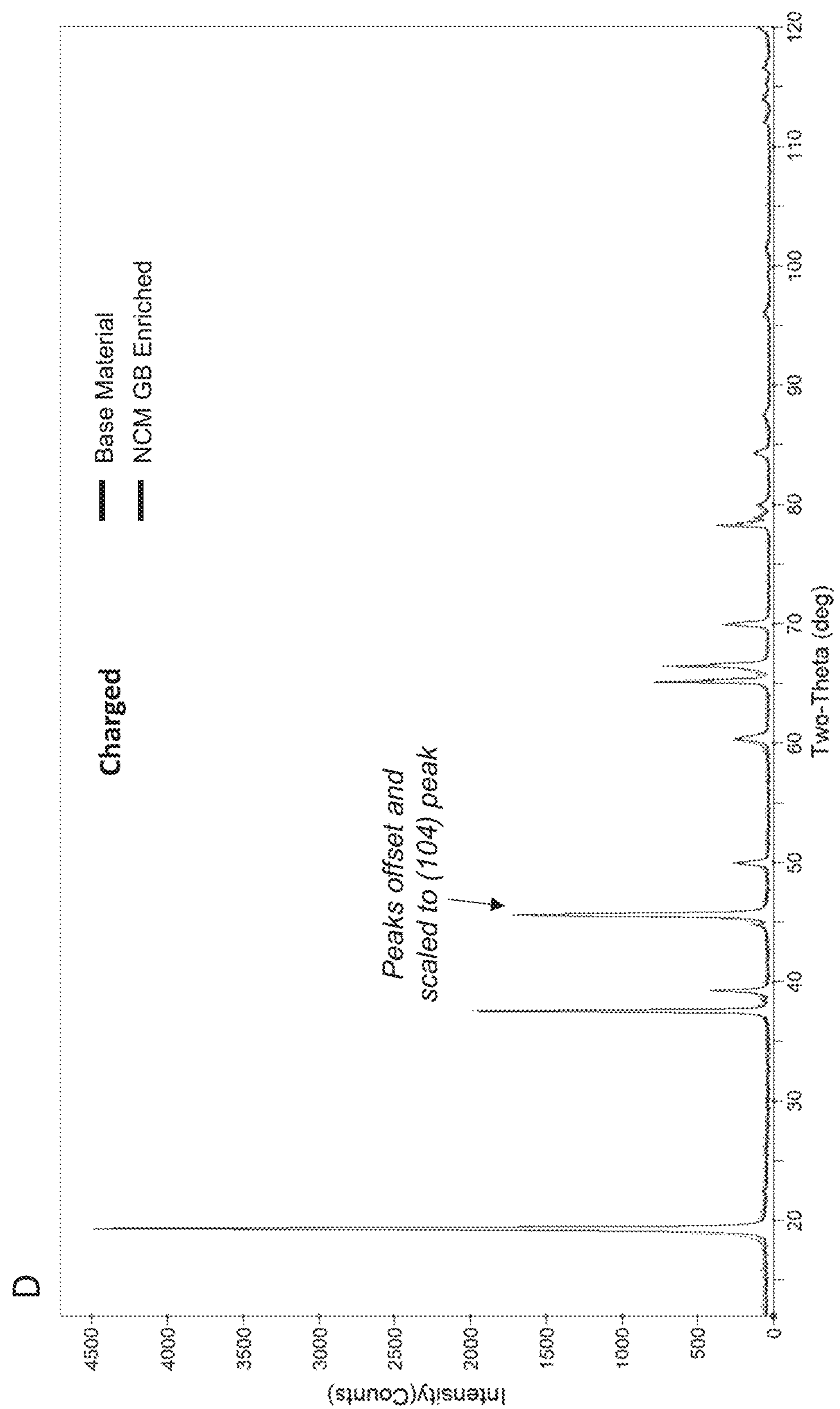
FIG. 5, cont.

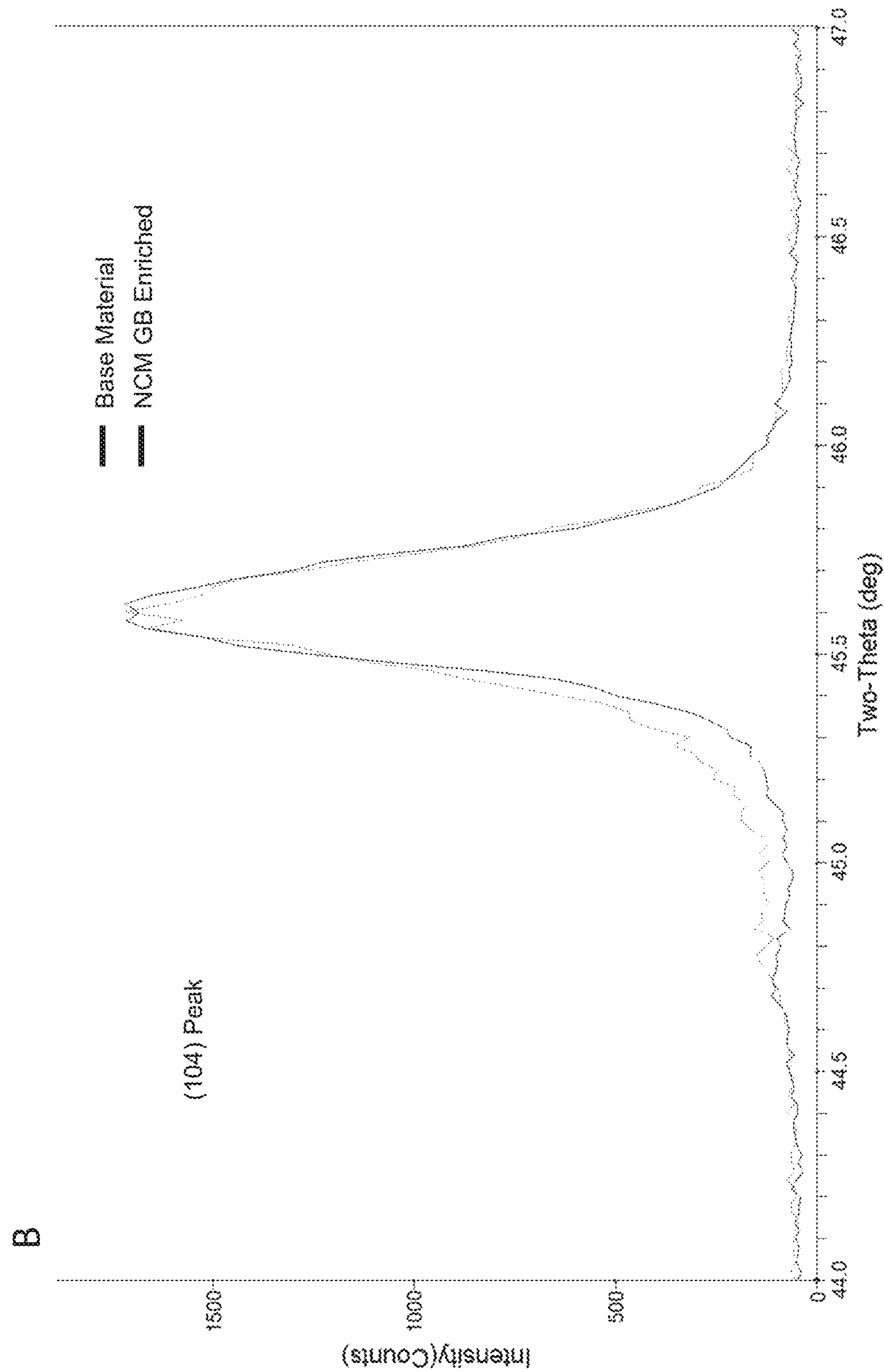
FIG. 6, cont.

STABLE CATHODE MATERIALS

CROSS REFERENCE TO RELATED APPLICATIONS

This application depends from and claims priority to U.S. Patent Application No. 62/796,950 filed Jan. 25, 2019, the entire contents of which are incorporated herein by reference.

FIELD

This disclosure is directed to electrochemically active materials for use in a cathode of a secondary battery.

BACKGROUND $LiMO_2$ materials based on lithium nickel oxide ($LiNiO_2$) in a layered structure are desirable as lithium battery cathode materials because they generally provide lower cost, higher capacity, and higher rate capability than lithium cobalt oxide ($LiCoO_2$). However, pure $LiNiO_2$ materials exhibit poor electrochemical stability and cycling performance. It has been found that by substituting varying amounts of other metals for some or much of the bulk material Ni in $LiNiO_2$, some of the capacity and cost benefits of $LiNiO_2$ can be obtained with improved electrochemical cycling stability.

It was also found that even such substituted $LiNiO_2$ materials may have inadequate stability when they are charged to high capacity (e.g., ≥220 mAh/g). As such, new materials are needed that have improved capacity and/or cycle life.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are electrochemically active particles that include grain boundaries with a higher electrochemical affinity for lithium that exhibit improved cycling ability with comparable capacity relative to base materials without stabilized grain boundaries. By increasing the electrochemical affinity for Li by selectively increasing the oxidation potential of the grain boundary region of the particles, the inventors found they could increase capacity retention and reduce impedance growth during cycling without significantly reducing capacity relative to that of the active material without grain boundary stabilization.

As such, provided are electrochemically active particles that may be used as an active material in a cathode of an electrochemical cell (or other such device), that include: a plurality of crystallites comprising a first composition comprising lithium, nickel, and oxygen; and a grain boundary between adjacent crystallites of the plurality of crystallites and comprising a second composition comprising lithium, nickel, and oxygen; wherein the grain boundary has a higher electrochemical affinity for lithium than the crystallites.

Also provided are electrochemically active particles that include a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium inside the crystallites when the particle is at a state of charge greater than or equal to 10 percent.

Also provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium in the crystallites when an electrode incorporating the particles is charged to a potential greater than or equal to 3.5 V versus lithium, or wherein lithium is present in the grain boundary at a higher concentration than lithium in the crystallites at a charge capacity of 40 mAh/g or greater.

Also provided are electrodes that incorporate one or more of the electrochemically active particles as provided herein. Electrochemical cells are also provided that include in the cathode one or more of the electrochemically active particles as provided herein.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

The inventors of this disclosure found that electrochemically extracting high levels of lithium from polycrystalline $LiMO_2$-based materials having 2D $\alpha$-$NaFeO_2$-type layered structure induces the 2D layers of transition metal atoms within the crystallite grain boundaries to reorganize into a NiO-type rock salt structure with associated reduction in transition metal oxidation state and loss of oxygen. This restructuring is initiated at grain boundaries and propagates deeper into the crystallites with repeated cycling. Sometimes, that restructuring is associated with mechanical damage including the appearance of cracks between adjacent crystallites. This loss of material stability at high levels of lithium extraction results in decreasing capacity and increasing impedance of the cathode materials as they are cycled.

This disclosure is based on the discovery that the performance of $LiNiO_2$-based materials can be improved by designing the materials to retain more lithium in the grain boundary region at the end of charge, thus preventing or slowing down grain boundary reconstruction. As such, provided in this disclosure are polycrystalline $LiMO_2$-based materials including 2D $\alpha$-$NaFeO_2$-type layered structure that selectively retain more Li in the grain boundaries than in their crystallites' interior structure when the materials are charged. Even in the charged state, these materials retain Li in the grain boundary where it is needed to stabilize the delithiated crystallite material against structural reconstruction propagating from the grain boundaries, while still releasing Li from the bulk crystallite structure to provide for high cycling capacity. Retention of higher Li levels in the grain boundaries of charged materials than in the bulk crystallites can be accomplished by selectively raising the local oxidation potential of the grain boundary region, thereby preventing grain boundaries from being delithiated to as great an extent as the $LiMO_2$ bulk crystallites when the materials are charged to a given electrochemical potential.

Figure 1:
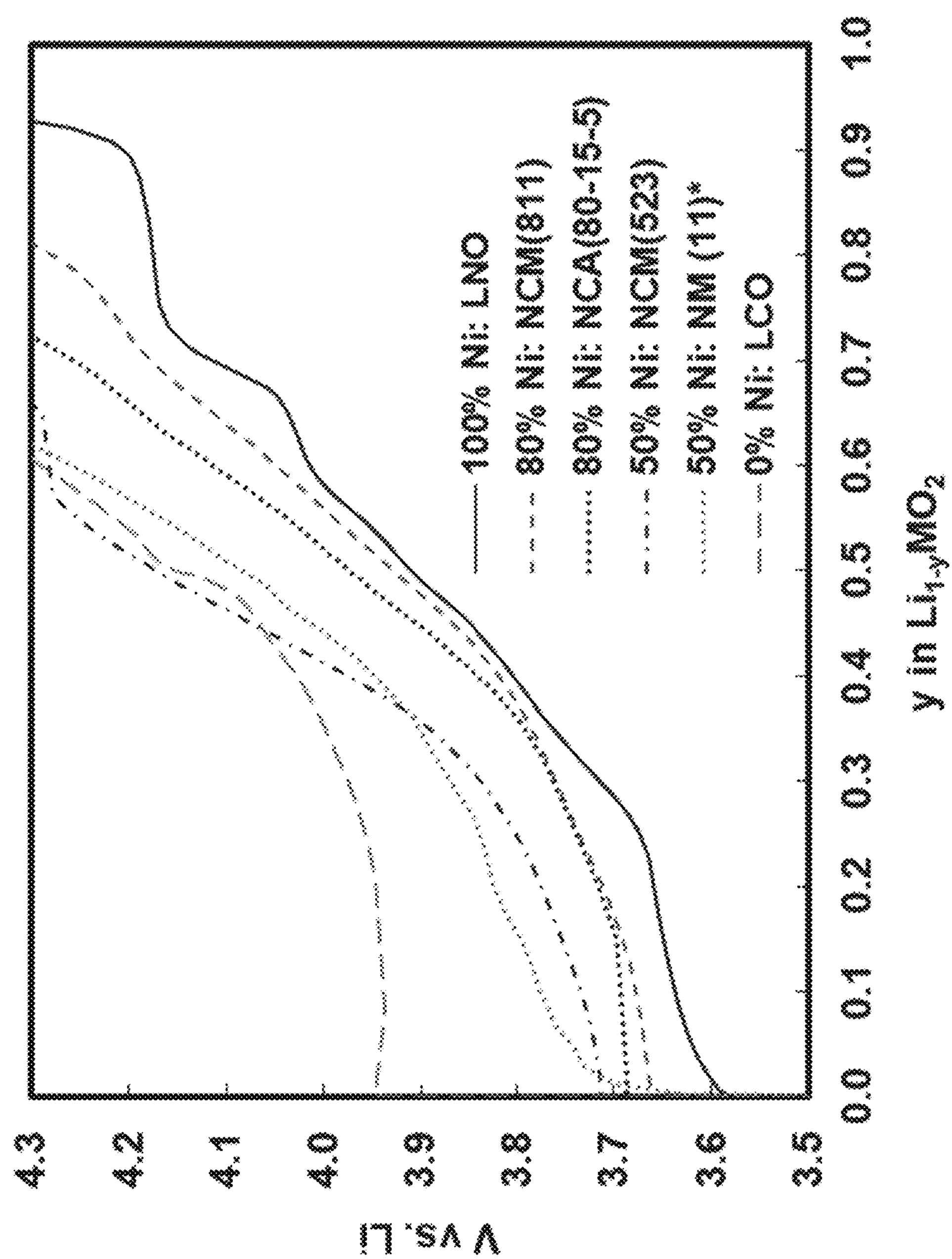
FIG. 1 illustrates that as the amount of Ni substitution in $LiMO_2$ by other metals increases, the amount of Li extracted from $LiMO_2$ upon charging to a given potential decreases.

The nature of the role that raising the local oxidation potential in the composition of $LiMO_2$ grain boundaries plays in promoting Li retention in those grain boundaries can be understood by referring to FIG. 1, which shows C/20 $1^{st}$ charge curves in Li metal anode half cells for cathode materials having varying proportions of Ni as M in $LiMO_2$. These data show that for a series of conventional $LiMO_2$-based Li-ion cathode materials, the potential at which Li is extracted upon charge increases, and the amount of Li that is extracted at a given potential decreases as the proportion of Ni in $LiMO_2$ decreases. Table 1 summarizes the FIG. 1 data showing that as the Ni content of an $LiMO_2$ material decreases, the amount of Li it retains when it is charged to 4.3 V vs. Li increases. Data in FIG. 1 and Table 1 are based on coin cell measurements made in-house with an exception of NM-11, which is based on Kang, K., et al., Science, 311 (17), 2006, p. 977 results.

TABLE 1

| x in $Li_xMO_2$ remaining in cathode materials charged to 4.3 V vs. Li. | | | |
|---|---|---|---|
| Material | Abbreviated name | x in $Li_xMO_2$ when charged to 4.3 V vs. Li | C/20 Charge to 4.3 V vs. Li (mAh/g) |
| $LiNiO_2$ | LNO | 0.06 | 258 |
| $LiNi_{0.8}Co_{0.1}Mn_{0.1}$ | NCM-811 | 0.19 | 223 |
| $LiNi_{0.8}Co_{0.15}Al_{0.05}O_2$ | NCA | 0.27 | 204 |
| $LiNi_{0.5}Co_{0.2}Mn_{0.3}$ | NCM-523 | 0.36 | 177 |
| $LiNi_{0.5}Mn_{0.5}$* | NM-11 | 0.38 | 174 |
| $LiCoO_2$ | LCO | 0.39 | 166 |

The metals replacing a portion of the Ni in the bulk of the LNO materials of FIG. 1 and Table 1 include Co and Mn that are representative of metals that effectively lessen the tendency for oxidation of $LiMO_2$ relative to Ni when the $LiMO_2$ materials are charged, and Al which is representative of metals that are not oxidized at all when $LiMO_2$ materials are charged. The relative amounts of such metal substituents impact these bulk materials' extent of oxidation and retention of Li. Therefore, although both NCM 811 and NCA have Ni composing 80% of M in $LiMO_2$, NCA retains more Li when it is charged to 4.3 V vs. Li because whereas both Co and Mn in NCM 811 can be oxidized, Al in NCA cannot be oxidized.

The differing impacts of raising the local oxidation potential for Ni in the $LiMO_2$ structure can generally be understood by considering simplified concepts such as the metals' oxidation potentials and/or their electron count in the context of crystal field theory. In the $LiMO_2$ stoichiometry, the mean oxidation state of M in the structure is +3. In the 2D $\alpha$-$NaFeO_2$-type layered structure, the M atoms are in a relatively strong octahedral field, which will therefore be stabilized by metals with $d^6$ ($t_{2g}{}^6$ crystal field configuration) and $d^3$ ($t_{2g}{}^3$ crystal field configuration) electron counts. $Co^{3+}$ is $d^6$, whereas $Ni^{3+}$ is $d^7$, and therefore $LiNiO_2$ is more prone to oxidation than $LiCoO_2$ because $LiNiO_2$ gains the stable $t_{2g}{}^6$ crystal field configuration when oxidized, whereas $LiCoO_2$ loses the $t_{2g}{}^6$ crystal field configuration when oxidized. Published X-ray absorption studies have indicated that Mn substitution for Ni results in Mn being accommodated in the stable +4 oxidation state ($t_{2g}{}^3$ crystal field configuration), charge-compensated by Ni in the +2 oxidation state ($t_{2g}{}^6 e_g{}^2$ crystal field configuration). Therefore, oxidation of Ni atoms to the more stable $t_{2g}{}^6$ configuration requires simultaneous transfer of two electrons and charge-compensating $Li^+$ ions, whereas oxidation of Ni atoms in $LiNiO_2$ proceeds by a more facile single electron/single ion process. Al in $LiMO_2$ is already in the 3+ oxidation state and does not have an accessible 4+ oxidation state at realistic battery cathode material potentials.

Figure 2:
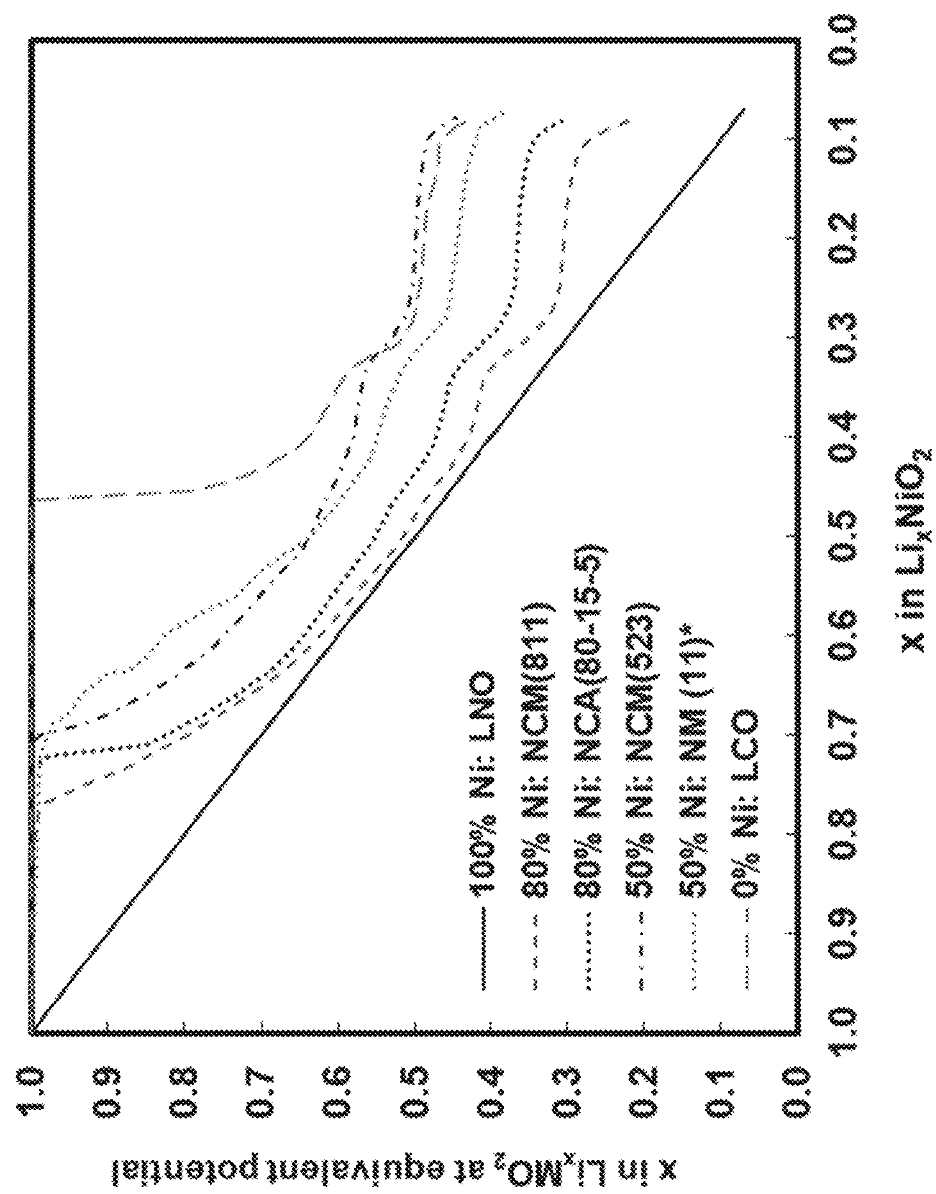
FIG. 2 illustrates that $LiMO_2$ materials with lower Ni content than $LiNiO_2$ are delithiated to a lesser extent than $LiNiO_2$ when the materials are charged to the same potential.

The preceding discussion of oxidation and Li retention in the bulk $LiMO_2$ cathode materials illustrates how substitution for Ni in the grain boundaries of $LiMO_2$ materials can provide for greater retention of Li in the grain boundaries than in the bulk crystallites when those materials are charged. Thus, for example, if a material with LNO bulk crystallite composition (M in $LiMO_2$ is 100% Ni) has grain boundaries with composition corresponding to one of the other materials in FIG. 1, the reframed FIG. 1 data that are plotted in FIG. 2 illustrate how much Li will be retained in the grain boundaries relative to the amount of Li retained in the LNO bulk crystallites when the material is oxidized (charged) to a given potential. The figure shows that the grain boundaries will retain more Li than the bulk crystallites at any potential or state of charge up to 4.3 V vs. Li. Similarly, these data can be normalized to the Li content of one of the other materials; for example, to show that materials with NCM(811) bulk crystallites and NCM(523) grain boundaries would also retain more Li in their grain boundaries than in the bulk crystallites when they were charged. Note that the 4.3 V vs. Li is illustrative, and similarly higher amount of Li can be retained in the grain boundaries than in the bulk even when the materials are charged to potentials higher or lower than 4.3V vs. Li.

As used herein the term "state of charge" (SoC) is the level of charge of a battery relative to its capacity. The units of SoC are percentage points (0%=empty or discharged; 100%=full or charged). For the lithium nickel oxide materials as provided herein full charge is achieved at a potential of 3.5 V or greater, optionally 4.1 V or greater, optionally 4.2 V or greater, optionally 4.3 V or greater, optionally 4.4 V or greater vs. Li.

As used herein the term "electrochemical affinity" for lithium is defined as the tendency to retain lithium when oxidized to a certain potential or voltage. Therefore, a material with a higher electrochemical affinity will retain more lithium when charged to a certain potential than a material with a lower electrochemical affinity for lithium. The potential can be a range of relevant potentials. A material with a higher electrochemical affinity for lithium implies that the material (or a portion of the material) will have a higher lithium content compared to a material with a lower electrochemical affinity when both materials are at the same potential.

As such provided are particles that include a plurality of crystallites comprising a first composition comprising lithium, nickel, and oxygen and having a layered $\alpha$-$NaFeO_2$-type structure, a grain boundary between adjacent crystallites of the plurality of crystallites and comprising a second composition having the layered $\alpha$-$NaFeO_2$-type structure, a cubic structure, a spinel structure, a monoclinic structure, or a combination thereof.

Also provided according to some aspects of this disclosure are particles that include a plurality of crystallites comprising a first composition including layered-layered compositions with an overall formula of $zLiMO_2.(1-z)Li_2M'O_3$ where z is in the range of $0.7<z<1.0$, optionally $0.8<z<0.95$ moles per mole of the composition. The layered-layered materials also include a grain boundary between adjacent crystallites of the plurality of crystallites and comprising a second composition having a layered $\alpha$-$NaFeO_2$-type structure, a cubic structure, a spinel structure, a monoclinic structure, or a combination thereof. In some exemplary aspects, M can include Ni, Co, Mn, or a combination thereof, and M' can include one or more of Mn, Ti, or Cr. It is noted that the oxidation potentials and electrochemical affinity of the grain boundary regions of the layered-layered materials may be as described for other materials as provided herein.

In the layered-layered materials, M optionally includes Ni alone or with one or more of Co, Mn, V, or Fe. The Ni component of M is optionally at or greater than 0.3 to 0.95 moles per mole of M. Co, if present in M is optionally present at 0 to 0.33 moles per mole of M. Mn, if present in M, is optionally present at equal to or greater than 0.05 to 0.8 moles per mole of M. In some aspects M includes Ni at greater than 0.3 to 0.95 moles per mole of M, Co at 0 to 0.33 moles per mole of M, and Mn at 0.05 to 0.5 moles per mole of M. In the layered-layered materials M' includes Mn alone or in addition to one or more of Ti, Zr, Ru, Re, and Pt.

In compositions having a layered $\alpha$-$NaFeO_2$-type structure, hexagonal metal oxide layers are separated by planes of the alkali metal (e.g. Li). The metal oxide layers form metal centered oxygen octahedra that are separated by alkali metal ions. These metal oxide layers are laterally offset to provide a three-layer structure. In a layered $\alpha$-$NaFeO_2$-type structure, the alkali metal atoms occupy the so called "3a" sites in the structure (x=0, y=0, and z=0), the metal atoms occupy the "3b" sites (x=0, y=0, and z=0.5), and the oxygen atoms occupy the "6c" sites (x=0, y=0, and z=0.25). The coordinates of the atoms and the cell parameters can vary according to the composition. Compositions having this structure type may have cell parameters in which a is about 2.75 to about 2.95 angstroms (Å), and c is about 13.9 to about 14.6 Å. By substituting a metal with a higher oxidation potential than Ni in the 3b sites of the grain boundary selectively, one can stabilize the particles as a whole relative to unstabilized materials of otherwise identical overall composition.

According to some aspects, materials as provided herein include a particle comprising a plurality of crystallites each comprising a first composition. The particle formed of a plurality of crystallites may be referred to as a secondary particle. The particles as provided herein are uniquely tailored to have grain boundaries between the primary crystallites where the grain boundaries include a second composition. Stabilizing these grain boundaries by increasing the electrochemical affinity for Li relative to the bulk crystallites, results in particles that provide improved performance and cycle life, as well as reduced impedance growth during cycling, of a cell incorporating the particles as a component of a cathode.

The particles are appreciated to include a grain boundary formed of or including a second composition, wherein the second composition differs from the first composition in that the electrochemical affinity for Li in the second composition is increased relative to a first composition defining the crystallites of the secondary particle. Optionally, the particles as provided herein are capable of maintaining a greater amount of Li in the grain boundary than in the crystallites at any particular state of charge greater than zero. Optionally, the particles as provided herein are capable of maintaining a greater amount of Li in the grain boundary than in the crystallites when the particle is at a given potential, or over a range of potentials. Optionally, the provided materials include a further outer coating layer that may be disposed on an outer surface of the secondary particle to provide a coated secondary particle.

In some aspects provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein the grain boundary has a higher electrochemical affinity for lithium than the crystallites. Higher electrochemical affinity for Li in the grain boundary promotes an increased concentration of Li in the grain boundary relative to the crystallites at any particular state of charge.

Optionally, the molar lithium content per mole of a second composition defining the grain boundary relative to the molar Li content per mole of a first composition defining the crystallites is found to be higher at a state of charge of 10% or greater, optionally 20% or greater, optionally 30% or greater, optionally 40% or greater, optionally 50% or greater, optionally 60% or greater, optionally 70% or greater, optionally 80% or greater, optionally 90% or greater, optionally 95% or greater, optionally 96% or greater, optionally 97% or greater, optionally 98% or greater, optionally 99% or greater, optionally 100%.

In some aspects, provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein the grain boundary has a higher electrochemical affinity for lithium than the crystallites at a state of charge of 10% or greater.

In some aspects provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein the grain boundary has a higher electrochemical affinity for lithium than the crystallites at a state of charge of 80% or greater.

In some aspects provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein the grain boundary has a higher electrochemical affinity for lithium than the crystallites at a state of charge of 100%.

Also provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium inside the crystallites when the particle is at a state of charge greater than or equal to 10 percent.

Optionally, the molar lithium concentration per mole of a second composition defining the grain boundary relative to the molar concentration of Li per mole of the first composition defining the crystallites is found to be higher at a state of charge of 10% or greater, optionally 20% or greater, optionally 30% or greater, optionally 40% or greater, optionally 50% or greater, optionally 60% or greater, optionally 70% or greater, optionally 80% or greater, optionally 90% or greater, optionally 95% or greater, optionally 96% or greater, optionally 97% or greater, optionally 98% or greater, optionally 99% or greater, optionally 100%.

Also provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium inside the crystallites when the particle is at a state of charge greater than or equal to 20 percent.

Also provided are electrochemically active particles that include: a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium inside the crystallites when the particle is at a state of charge greater than or equal to 80 percent.

Also provided are electrochemically active particles that may be used in a cathode of an electrochemical cell that may include: a plurality of crystallites comprising a first composition comprising lithium, nickel, and oxygen; a grain boundary between adjacent crystallites of the plurality of crystallites and comprising a second composition comprising lithium, nickel, and oxygen; wherein lithium is present in the grain boundary at a higher concentration than lithium in the crystallites when an electrode incorporating the particle is charged to a potential greater than or equal to 4.00 V versus lithium.

Optionally, the lithium is present in the grain boundary at a higher concentration than lithium in the crystallites when an electrode incorporating the particle is charged to a potential greater than or equal to 4.1 V versus lithium. Optionally, the lithium is present in the grain boundary at a higher concentration than lithium in the crystallites when an electrode incorporating the particle is charged to a potential greater than or equal to 4.2 V versus lithium. Optionally, the lithium is present in the grain boundary at a higher concentration than lithium in the crystallites when an electrode incorporating the particle is charged to a potential greater than or equal to 4.25 V versus lithium. Optionally, the lithium is present in the grain boundary at a higher concentration than lithium in the crystallites when an electrode incorporating the particle is charged to a potential greater than or equal to 4.3V versus lithium.

The increase in the amount of Li retained in the second composition of the grain boundary relative to the bulk is optionally 0.02 moles Li per mole of the second composition or greater at the potential as provided in the preceding paragraphs. Optionally, at the potentials as provided in the preceding paragraphs, the moles of Li per mole of the second composition is greater than the moles of Li per mole of the first composition by 0.01, optionally by 0.02, optionally by 0.05, optionally by 0.1, optionally 0.15, optionally 0.2, optionally 0.25, optionally 0.3.

Also provided are electrochemically active particles that may be used in a cathode of an electrochemical cell that may include: a plurality of crystallites comprising a first composition comprising lithium, nickel, and oxygen; a grain boundary between adjacent crystallites of the plurality of crystallites and comprising a second composition comprising lithium, nickel, and oxygen; lithium is present in the grain boundary at a higher concentration than lithium in the crystallites at a charge capacity of the particles of 40 mAh/g or greater.

The concentration of Li in the grain boundaries is increased relative to the crystallites when the particle is charged to a capacity of optionally 50 mAh/g or greater, optionally 60 mAh/g or greater, optionally 70 mAh/g or greater, optionally 80 mAh/g or greater, optionally 90 mAh/g or greater, optionally 100 mAh/g or greater, optionally 110 mAh/g or greater, optionally 120 mAh/g or greater, optionally 130 mAh/g or greater, optionally 140 mAh/g or greater, optionally 150 mAh/g or greater, optionally 160 mAh/g or greater, optionally 170 mAh/g or greater, optionally 180 mAh/g or greater, optionally 190 mAh/g or greater, optionally 200 mAh/g or greater, optionally 220 mAh/g or greater.

Optionally, at a given potential or at a charge capacity of 40 mAh/g or greater, the moles of Li per mole of the second composition is greater than the moles of Li per mole of the first composition by 0.01, optionally by 0.02, optionally by 0.05, optionally 0.1, optionally 0.15, optionally 0.2, optionally 0.25, optionally 0.3. Optionally, the increase in the amount of Li retained in the second composition of the grain boundary relative to the amount of Li retained in the first composition of the crystallite is 0.01 moles Li per mole of the second composition or greater, optionally 0.15 moles Li per mole of the second composition or greater, optionally 0.2 moles Li per mole of the second composition or greater, optionally 0.25 moles Li per mole of the second composition or greater, optionally 0.3 moles Li per mole of the second composition or greater. Optionally, the amount of Li retained in the second composition is greater, optionally by the foregoing amount, than the amount of Li retained in the first composition at a charge capacity of the particle of 50 mAh/g or greater, optionally 60 mAh/g or greater, optionally 70 mAh/g or greater, optionally 80 mAh/g or greater, optionally 90 mAh/g or greater, optionally 100 mAh/g or greater, optionally 110 mAh/g or greater, optionally 120 mAh/g or greater, optionally 130 mAh/g or greater, optionally 140 mAh/g or greater, optionally 150 mAh/g or greater, optionally 160 mAh/g or greater, optionally 170 mAh/g or greater, optionally 180 mAh/g or greater, optionally 190 mAh/g or greater, optionally 200 mAh/g or greater, optionally 220 mAh/g or greater.

In some aspects of the presently provided particles, the first composition that defines the crystallites of the secondary particle includes polycrystalline layered-structure lithiated metal oxides defined by composition defined by Formula I:

$$Li_{1+x}MO_{2+y} \quad (I)$$

and optionally a cell or battery formed therefrom, where $-0.1 \leq x \leq 0.3$ and $-0.3 \leq y \leq 0.3$ when in a state of discharge or where $-0.9 \leq x \leq 0.1$ and $-0.3 \leq y \leq 0.3$ when in a state of charge. In some aspects, x is −0.1, optionally 0, optionally 0.1, optionally 0.2, or optionally 0.3. Optionally, x is greater than or equal to −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is −0.3, optionally −0.2, optionally −0.1, optionally 0, optionally 0.1, optionally 0.2, or optionally 0.3. Optionally, y is greater than or equal to −0.30, −0.29, −0.28, −0.27, −0.26, −0.25, −0.24, −0.23, −0.22, −0.21, −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3.

It is appreciated that in some aspects Li need not be exclusively Li, but may be partially substituted with one or more elements selected from the group consisting of Mg, Sr, Na, K, and Ca. The one or more elements substituting Li, are optionally present at 10 atomic % or less, optionally 5 atomic % or less, optionally 3 atomic % or less, optionally no greater than 2 atomic percent, where percent is relative to total Li in the material.

M as provided in the first composition includes Ni. The amount of Ni in the first composition is optionally from 10 atomic percent to 100 atomic percent (at %) of total M. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 97 at %, 98 at %, 99 at %, 99.5 at %, 99.9 at %, or 100 at %.

In some aspects, M in the first composition is Ni alone or in combination with one or more additional elements. The additional elements are optionally metals. Optionally, an additional element may include or be one or more of Mg, Sr, Co, Al, Ga, Ca, Cu, Zn, Mn, V, Ba, Y, Nb, Zr, Ti, Cr, Fe, Mo, W, B, and any combination thereof. In particular aspects, the additional element may include Mg, Co, Al, or a combination thereof. Optionally, the additional element may be Mg, Al, V, Ti, B, or Mn, or a combination thereof. Optionally, the additional element is selected from the group consisting of Mg, Al, V, Ti, B, or Mn. Optionally, the additional element is selected from the group consisting of Mg, Co, and Al. Optionally, the additional element selected from the group consisting of Ca, Co, and Al. In some aspects, the additional element is Mn or Mg, or both Mn and Mg. Optionally, the additional element is Mn, Co, Al, or any combination thereof. Optionally the additional element includes Co and Mn. Optionally, the additional element is Co and Al. Optionally the additional element is Co.

An additional element of the first composition may be present in an amount of about 1 to about 90 at % of total M, specifically about 5 to about 80 at %, more specifically about 10 to about 70 at % of M in the first composition. Optionally, the additional element may be present in an amount of about 1 to about 20 at %, specifically about 2 to about 18 at %, more specifically about 4 to about 16 at %, of M in the first composition. In some illustrative examples, M is about 75-100 at % Ni, 0-15 at % Co, 0-15 at % Mn, and 0-10 at % additional elements.

Within the polycrystalline material, each crystallite may have any suitable shape, which can be the same or different within each particle. Further, the shape of each crystallite can be the same or different in different particles. Because of its crystalline nature, the crystallite may be faceted, the crystallite may have a plurality of flat surfaces, and a shape of the crystallite may approximate a geometric shape. In some aspects, the crystallite may be fused with neighboring crystallites with mismatched crystal planes. The crystallite may optionally be a polyhedron. The crystallite may have a rectilinear shape, and when viewed in cross-section, a portion of or an entirety of the crystallite may be rectilinear. The crystallite may be square, hexagonal, rectangular, triangular, or a combination thereof. A crystallite is optionally a single crystal and a particle is optionally an agglomerate of single crystals.

The particles include a grain boundary that separates two adjacent crystallites. A grain boundary includes a second composition. In some aspects, the grain boundary comprises a second composition having the $\alpha$-$NaFeO_2$-type structure with the generic Formula II:

$$Li_{1+x}M'O_{2+y} \quad (II)$$

wherein M' is defined as M in the first composition but with a relatively lower mole Ni per mole of $LiMO_2$. The Ni sites in the crystal structure are substituted with one or more substitution elements that increases the electrochemical affinity for lithium of the structure relative to the unsubstituted material such that the amount of the substitution elements are at a greater mole per mole concentration in the second composition than in the first composition, and optionally at a state of charge of 80% or greater or at a charge capacity of 150 mAh/g or greater, $-0.6 \leq x \leq -0.2$. In some aspects, x is −0.6, optionally −0.65, optionally −0.7, optionally −0.75, optionally −0.8, optionally −0.9, optionally −0.95. In some aspects, y is −0.3, optionally −0.2, optionally −0.1, optionally 0, optionally 0.1, optionally 0.2, or optionally 0.3. Optionally, y is greater than or equal to −0.30, −0.29, −0.28, −0.27, −0.26, −0.25, −0.24, −0.23, −0.22, −0.21, −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3. When the particles with the stabilized second composition are incorporated in a cathode electrochemically charged to about 4.3 V (can be lower or higher based on the specific application) improved performance is observed resulting from the increased electrochemical affinity for Li relative to the crystallites.

Optionally, Ni in the second composition can be in the range of 0 to 0.99 moles per mole of M' in the second composition. Optionally, M' in the second composition is free of Ni. Optionally, the amount (i.e. relative concentration) of Ni in the second composition is lower than the amount of Ni in the first composition in relative atomic percent (with respect to the respective composition in which the Ni is present). Optionally, the Ni component of M' is less than or equal to 1 moles per mole of M'. Optionally, the Ni component of M' is less than or equal to 0.5 moles per mole of M'. Optionally, the Ni component of M' is less than or equal to 0.10 moles per mole of M'. Optionally, the Ni component of M' is less than or equal to 0.20 moles per mole of M'. Optionally, the Ni component of M' is less than or equal to 0.75 moles per mole of M'. Optionally, the Ni component of M' is less than or equal to 0.80 moles per mole of M'. Optionally, the Ni component of M' is less than or equal to 0.85 moles per mole of M'. Optionally, the Ni component of M' is less than or equal to 0.90 moles per mole of M'. Optionally, the Ni component of M' is less than or equal to 0.95 moles per mole of M'. Optionally, the Ni component of M' is less than or equal to 0.75 moles per mole of M', 0.76 moles per mole of M', 0.77 moles per mole of M', 0.78 moles per mole of M', 0.79 moles per mole of M', 0.80 moles per mole of M', 0.81 moles per mole of M', 0.82 moles per mole of M', 0.83 moles per mole of M', 0.84 moles per mole of M', 0.85 moles per mole of M', 0.86 moles per mole of M', 0.87 moles per mole of M', 0.88 moles per mole of M', 0.89 moles per mole of M', 0.90 moles per mole of M', 0.91 moles per mole of M', 0.92 moles per mole of M', 0.93 moles per mole of M', 0.94 moles per mole of M', 0.95 moles per mole of M', 0.96 moles per mole of M', 0.97 moles per mole of M', 0.98 moles per mole of M', 0.99 moles per mole of M', or 0.999 moles per mole of M'.

For the materials as provided herein, the nominal or overall formulated composition of the secondary particles (for example, characterized by Inductively Coupled Plasma (ICP)), optionally the first composition, or optionally the second composition, is defined by the nominal formula $LiMO_2$, wherein M is Ni and optionally one or more substitution elements that in the second composition must include at least one element substituting for Ni in the crystal structure that imparts greater electrochemical affinity for Li to the second composition relative to the first composition. The mole fraction of the substitution element in the first composition, if present, as defines the composition of the crystallites is lower than the mole fraction of the total substitution element(s) independently or combined in the total particle composition as determined by ICP. The mole fraction of the substitution element independently or combined in the first composition can be zero. The mole fraction of the substitution element in the second composition independently or combined as defines the grain boundary is higher than the mole fraction of the substitution element(s) independently or combined in the total particle as measured by ICP.

Examples of substitution elements that can potentially be included in M' in Formula II and promote the retention of Li in the grain boundaries of charged high-Ni $LiMO_2$ cathode materials include a variety of elements that can substitute for Ni in the $LiM'O_2$ structure. Such doping elements can promote Li retention (i.e. greater electrochemical affinity for Li) by being more resistant to oxidation (having higher oxidation potential) than the Ni atoms they are substituting for, by stabilizing the structure to oxidation, or by inductively raising the oxidation potential of nearby Ni atoms. If trivalent (3+) ions of doping elements that can directly substitute for $Ni^{3+}$ are less easily oxidized than the Ni ions when the material is charged, they will promote Li retention; substitution of Ni(III) by Al(III) is an example. If tetravalent (4+) ions substitute for $Ni^{3+}$, they are charge-compensated by Ni ions in the 2+ state and their inductive effects raise the potential for oxidation of those Ni ions to the 4+ state; substitution of Ni(III) by Mn(IV) is an example. Alternatively, if difficult to oxidize 2+ ions substitute for Ni, they are charge-compensated by Ni ions in the 4+ state; substitution of Ni(III) by Mg (II) is an example. In order to substitute for Ni in the $LiM'O_2$ structure, doping ions must be of size comparable to that of the Ni ions, and in order to facilitate retention of Li, they must raise the local oxidation potential. The relative impact of a given ion's impact on the oxidation potential can often be estimated from its ionization energy relative to that of $Ni^{3+}$. Therefore, ions of size comparable to $Ni^{3+}$ and having comparable or higher ionization energy can potentially serve to stabilize oxidized cathodes' grain boundaries by increasing their retention of Li. The following table provides the ionization energies and hexacoordinate (octahedral environment) ionic radii for examples of ions that might stabilize the grain boundaries of charged high-Ni $LiMO_2$ cathode materials by increasing the grain boundaries' retention of Li.

TABLE 2

Oxidation potentials and ionic radii for elements*

| ion | ionization energy (kJ/mol) | ionic radius (angstroms) |
|---|---|---|
| Ni 2+ | 3395 | 0.69 |
| Ni 3+ | 5300 | 0.56-0.6 |
| Ni 4+ | 7339 | 0.48 |
| Co 3+ | 4950 | 0.545-0.61 |
| Co 4+ | 7670 | 0.53 |
| Al 3+ | 11577 | 0.535 |
| Mn 3+ | 4940 | 0.58-0.645 |
| Mn 4+ | 6990 | 0.53 |
| Mg 2+ | 7733 | 0.72 |
| Ti 4+ | 9581 | 0.605 |
| V 4+ | 6299 | 0.58 |
| Cr 3+ | 4743 | 0.615 |
| Cr 4+ | 6702 | 0.55 |
| Fe 3+ | 5290 | 0.55-0.645 |
| Fe 4+ | 7240 | 0.585 |
| Cu 2+ | 5536 | 0.73 |
| Cu 3+ | 7700 | 0.54 |
| Zn 2+ | 5731 | 0.74 |
| Ga 3+ | 6180 | 0.62 |
| Zr 4+ | 7752 | 0.72 |

TABLE 2-continued

| Oxidation potentials and ionic radii for elements* | | |
|---|---|---|
| ion | ionization energy (kJ/mol) | ionic radius (angstroms) |
| Mo4+ | 5257 | 0.65 |
| Sn 4+ | 7456 | 0.69 |
| Y 3+ | 5847 | 0.9 |
| Y 4+ | 7430 | <0.9 |

*ionization energy

In the second composition, M' further includes one or more substitution elements that may be selected from a group that oxidize less than nickel when electrochemically charged to 4.3V or higher relative to Li metal anode. In one example, M' can comprise Ni and a combination of Co and Mn, which oxidizes less than nickel when charged to 4.3V. In other aspects, M' may include Ni and one more elements selected from the group comprising Mn, Cr, Fe, Ti, V, Co, Cu, Zn, Zr, Nb, Sb, W, Sc, Al, Mo, Y, etc., which oxidize less than Ni when charged to 4.3V relative to lithium metal. Optionally, M' excludes the combination of Ni with Co alone, Al alone, or a combination of Co and Al, and Co, Al, or both may be present with doping of one or more additional substitution elements as provided herein. In some aspects, M' may include an element selected from the group of elements that will not oxidize when charged to 4.3V relative to lithium such as Y, Sc, Ga, In, Tl, Si, Ge, Sn, Pb, etc.

Note that 4.3V is chosen as a representative example only. The voltage can also be lower (e.g. 4.0, 4.1, 4.2, etc. vs. Li) or higher (4.35, 4.4, 4.5 V, 4.6V, 4.7V vs. Li). Specific voltage of interest would depend on the operating potential of the battery when the cathode is paired with the anode.

In some aspects, the second composition of the grain boundaries has greater electrochemical affinity for Li such that when an electrode incorporating the particle is charged to a potential greater than or equal to 4.1 V versus lithium, optionally greater than or equal to 4.2 V versus lithium, optionally greater than or equal to 4.3V versus lithium, the grain boundary retains greater than 0.15 moles of lithium per mole of the second composition at said potential.

In some aspects, the second composition of the grain boundaries has greater electrochemical affinity for Li such that when an electrode incorporating the particle is charged to a capacity of 100 mAh/g or greater, optionally 200 mAh/g or greater, the grain boundary retains greater than 0.15 moles of lithium per mole of the second composition at said potential.

Optionally, at the potential or capacity as illustrated herein, the second composition comprises lithium in an amount of about 0.1 to about 1.3 moles, specifically about 0.15 to about 1.2 moles, more specifically about 0.3 to about 1.1 moles, per mole of the second composition; nickel in an amount of about 0.1 to about 0.999 mole, specifically about 0.2 to about 0.90 mole, more specifically about 0.3 to about 0.85 mole, per mole of the second composition; manganese in an amount of about 0.02 to about 0.99 mole, specifically about 0.04 to about 0.90 mole, more specifically about 0.06 to about 0.80 mole, per mole of the second composition; and oxygen in an amount of about 1.7 to about 2.3 moles, specifically about 1.8 to about 2.2 moles, more specifically about 1.9 to about 2.1 moles per mole of the second composition.

The second composition may further comprise an additional metal, and the additional metal of the second composition may be present in an amount of about 0.01 to about 0.9 mole, specifically about 0.05 to about 0.8 mole, more specifically about 0.1 to about 0.7 mole, per mole of the second composition. In an embodiment, the additional metal of the second composition may be present in an amount of about 0.01 to about 0.2 mole, specifically about 0.02 to about 0.18 mole, more specifically about 0.04 to about 0.16 mole, per mole of the second composition.

The additional metal of the second composition may include Mg, Sr, Ca, Cu, Zn, Mn, Al, V, Ba, Zr, Ti, Cr, Fe, Mo, B, or a combination thereof. Optionally, the additional metal of the second composition includes Mg, Al, V, Ti, B, Zr, or Mn, or a combination thereof. Optionally, the additional metal of the second composition includes of Mg, Al, V, Ti, B, Zr, or Mn. An embodiment in which the additional metal of the second composition is Mn or Mg is specifically mentioned. Optionally, the additional metal of the first composition and the additional metal of the second composition are each Mg. Optionally, the first composition further comprises Mn, and the Mn is present in the first composition in an amount of about 0.01 to about 0.6 mole, specifically about 0.02 to about 0.5 mole, per mole of the first composition, and the second composition comprises Mn, and the Mn is present in the second composition in an amount of about 0.01 to about 0.6 mole, specifically about 0.02 to about 0.5 mole, per mole of the second composition.

The grain boundary is between adjacent crystallites, is on a surface of the crystallite, and comprises or consists of the second composition. The second composition has the layered $\alpha$-$NaFeO_2$-type structure, a cubic structure, a monoclinic structure, or a combination thereof. As noted above, the grain boundary includes at least one substitution element such that the electrochemical affinity for Li of the second composition is greater than that of the first composition as found in the bulk crystallites. An embodiment in which the grain boundaries include or consist of a layered $\alpha$-$NaFeO_2$-type structure is specifically mentioned.

The shape of the grain boundary is defined by the shape of the crystallite adjacent to the grain boundary. The shape of the grain boundary may approximate a geometric shape. The grain boundary may have a rectilinear shape, and when viewed in cross-section the grain boundary may be rectilinear. The grain boundary may be square, hexagonal, rectangular, triangular, or a combination thereof.

A direction of a surface of the grain boundary corresponds to a direction of a surface of the adjacent crystallite(s). The surface of the grain boundary and the surface of the crystallite may have any of a variety of orientations relative to an outer surface of the secondary particle. Thus the direction of the surface of the crystallite and the direction of the surface of the grain boundary may be parallel to or be different from the direction of a nearest outer surface of the secondary particle. In some aspects, a direction of a tangent of the nearest outer surface of the particle is different than the direction of the surface of the grain boundary and the direction of the surface of the adjacent particle.

The grain boundaries may intersect to form an angle therebetween. In some aspects, disposed on adjacent faces of a crystallite is a first grain boundary and second grain boundary. The first grain boundary and the second grain boundary intersect at an angle E. The angle E may be defined by the shape of the crystallite on which the first grain boundary and the second grain boundary are disposed. Generally, a shape of a crystallite is influenced by a crystal structure of the crystallite. While not wanting to be bound by theory, it is understood that because the crystal structure of the first composition governs the shape of the crystallite, the angle between the first and second grain boundaries is influenced by the crystal structure of the first composition. The first and second grain boundaries may intersect at any angle, specifically an angle of about 10 to about 170 degrees, specifically about 20 to about 160 degrees, more specifically about 30 to about 150 degrees, so long as the angle is consistent with the crystal structure of the first composition.

The dimensions of the grain boundary are not particularly limited. A length and a width of the grain boundary may each independently be about 10 to about 1000 nm, specifically about 60 to about 900 nm, more specifically about 70 to about 800 nm. The length and width of the grain boundaries are perpendicular to each other and are parallel to the surface of the adjacent crystallite(s). A thickness of the grain boundary may be about 0.5 to about 30 nm, specifically about 1 to about 20 nm, more specifically about 1 to about 10 nm. The thickness of the grain boundary is substantially perpendicular to the length and the width of the grain boundary and may be perpendicular to the surface of the adjacent crystallite. The composition of the grain boundary may be substantially uniform or may vary along the thickness.

An average grain boundary length and an average grain boundary width of the plurality of grain boundaries may each independently be about 10 to about 1000 nm, specifically about 60 to about 900 nm, more specifically about 70 to about 800 nm. Also, an average grain boundary thickness of the plurality of grain boundaries may be about 0.1 to about 30 nm, specifically about 1 to about 20 nm, more specifically about 1 to about 10 nm.

Optionally, a particle as provided herein includes an outer coating such as a passivation layer or a protective layer that may be deposited on an outer surface of the secondary particle to provide a coated secondary particle. The coating may fully or partially cover the secondary particle. The outer coating layer may be amorphous or crystalline. The outer coating layer may comprise an oxide, a sulfate, a phosphate, a pyrophosphate, a fluorophosphate, a carbonate, a fluoride, an oxyfluoride, or a combination thereof, of a metal such as Zr, Al, Ti, Al, B, or Si, or a combination thereof. Optionally, the outer coating layer includes a borate, an aluminate, a silicate, a fluoroaluminate, or a combination thereof. Optionally, the outer coating layer comprises a carbonate. In an embodiment, the layer comprises $ZrO_2$, $Al_2O_3$, $TiO_2$, $AlPO_4$, $AlF_3$, $B_2O_3$, $SiO_2$, $Li_2O$, $Li_2CO_3$, or a combination thereof. A layer comprising $AlPO_4$ or $Li_2CO_3$ is specifically mentioned. Optionally, an outer coating layer includes oxide of one or more elements selected from Al, Zr, Y, Co, Ni, Mg, and Li. Optionally, an outer coating layer includes a fluoride comprising one or more elements selected from Al, Zr, and Li. Optionally, an outer coating layer includes a carbonate comprising one or more elements selected from Al, Co, Ni, Mn, and Li. Optionally, an outer coating includes a sulfate comprising one or more elements selected from Al, Co, Ni, Mn, and Li. Optionally, an outer coating includes a phosphate comprising one or more elements selected from Al and Li. The layer may be deposited by any process or technique that does not adversely affect the desirable properties of the secondary particle. Representative methods include spray coating and immersion coating, for example.

A secondary particle may be formed by a multi-step process whereby a first composition particle is formed and calcined so as to establish the formation of defined grain boundaries optionally with the crystallites having $\alpha$-$NaFeO_2$ structure with few defects. The resulting secondary particles are then subjected to a liquid process that applies one or more substitution elements at the desired concentration levels followed by drying and then a second calcination so as to move the substitution element precipitated species at the surface selectively into the grain boundaries to thereby form the secondary particle with a stabilized grain boundary that has a higher electrochemical affinity for Li than the bulk crystallites. According to methods of manufacturing a secondary particle that has a base of Ni, Co, and Mg as provided herein as an example, formation may include: combining a lithium compound, and a hydroxide precursor compound of one or more metals or metalloids (e.g. Ni, Co, and Mg combined as previously generated such as by a co-precipitation reaction) to form a mixture; heat treating the mixture at about 30 to about 200° C. to form a dried mixture; heat treating the dried mixture at about 200 to about 500° C. for about 0.1 to about 5 hours; then heat treating at 600° C. to less than about 950° C. for about 0.1 to about 20 hours to manufacture the secondary particle. A first calcination maximum temperature is relative and specific to the material used in the hydroxide precursor. Optionally, in a first calcination, a maximum temperature may be at or less than 850 degrees Celsius, optionally at or less than 720 degrees Celsius, optionally at or less than 715 degrees Celsius, optionally at or less than 710 degrees Celsius, optionally at or less than 705 degrees Celsius, optionally at or less than 700 degrees Celsius. Optionally, the maximum temperature of the first calcination may be about 680 degrees Celsius or less. Optionally, the maximum temperature may be about 660 degrees Celsius or less. Optionally, the maximum temperature may be about 640 degrees Celsius or less. In yet other aspects, the maximum temperature may be less than about 700 degrees Celsius, about 695 degrees Celsius, about 690 degrees Celsius, about 685 degrees Celsius, about 680 degrees Celsius, about 675 degrees Celsius, about 670 degrees Celsius, about 665 degree Celsius, about 660 degrees Celsius, about 655 degrees Celsius, about 650 degrees Celsius, about 645 degrees Celsius, or about 640 degrees Celsius. The dwell time at the maximum temperature is optionally less than 10 hours. Optionally, the dwell time at the maximum temperature is less than or equal to 8 hours; optionally less than or equal to 7 hours; optionally less than or equal to 6 hours; optionally less than or equal to 5 hours; optionally less than or equal to 4 hours; optionally less than or equal to 3 hours; optionally less than or equal to 2 hours.

After the first calcination, subsequent processing may include breaking up the calcined material with a mortar and pestle so that the resulting powder passes through a desired sieve, optionally a #35 sieve. The powder is optionally then jar milled in a 1 gallon jar with a 2 cm drum YSZ media for optionally 5 minutes or an adequate time such that the material may pass through optionally a #270 sieve.

The product of the first calcination or milled product may be subsequently processed, optionally by a method so as to result in stabilized grain boundaries following a second calcination. A process to stabilize grain boundaries and create a greater grain boundary electrochemical affinity for Li than the crystallites within a primary particle may be performed by suspending the product of the first calcination in an aqueous slurry comprising one or more substitution elements and a lithium compound optionally at a temperature of about 60 degrees Celsius whereby the substitution element(s) is present in the aqueous solution at the concentrations as desired so as to result in stabilization. The slurry may then be spray dried to form a free-flowing powder that is then subjected to a second calcination optionally with a heating curve following a two-step ramp/dwell process. Alternatively, a substitution element(s) may be dispersed in a non-aqueous solvent along with suspended polycrystalline material. The non-aqueous solvent can be removed by evaporation with the substitution elements precipitated out on the surface of the polycrystalline material that is then subjected to a second calcination optionally with a heating curve following a two-step ramp/dwell process. The first of the two ramp/dwell temperature profiles may be from ambient (about 25 degrees Celsius) to 450 degrees Celsius and optionally at a rate of 5 degrees Celsius per minute with a 1 hour hold at 450 degrees Celsius. Subsequently, the second ramp/dwell step may be from 450 degrees Celsius to a maximum temperature at a rate of 2 degree Celsius per minute with a 2 hour hold at the maximum temperature. In some aspects, the maximum temperature is less than or equal to about 850 degrees Celsius.

By combining a first calcination with a maximum temperature as described above with a process to incorporate one or more substitution elements into the resulting grain boundaries by a second calcination also as described above, it was found that the resulting particles could be used in a cathode so as to produce significantly improved cycle life, reduced capacity fade, and reduced impedance growth, and/or significantly improving the electrochemical performance of the material.

Also provided are cathodes for a lithium-ion battery comprising the secondary particle. The cathode comprises the secondary particle disclosed above as an active material, and may further include a conductive agent and a binder. The conductive agent may include any conductive agent that provides suitable properties and may be amorphous, crystalline, or a combination thereof. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may include any binder that provides suitable properties and may comprise polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(l-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured by combining the secondary particle, the conductive agent, and the binder in a suitable ratio, e.g., about 80 to about 98 weight percent of the secondary particle, about 2 to about 20 weight percent of the conductive agent, and about 2 to about 10 weight percent of the binder, based on a total weight of the secondary particle, the conductive agent, and the binder. The secondary particle, the conductive agent, and the binder may be suspended in a suitable solvent, such as N-methylpyrrolidone, and disposed on a suitable substrate, such as aluminum foil, and dried in air.

Also disclosed is a battery comprising the cathode. The battery may be a lithium-ion battery, a lithium-polymer battery, or a lithium battery, for example. The battery may include a cathode, an anode, and a separator interposed between the cathode and the anode. The separator may be a microporous membrane, and may include a porous film including polypropylene, polyethylene, or a combination thereof, or may be a woven or non-woven material such a glass-fiber mat. The anode may include a coating on a current collector. The coating may include a suitable carbon, such as graphite, coke, a hard carbon, or a graphitized mesocarbon such as a mesocarbon microbead, for example. The anode may also include lithium metal or a material capable of alloying (e.g. Si, Ge, etc.) or conversion reactions (e.g. metal oxides or sulfides) with lithium. Alternatively, the anode maybe be titanium containing materials such as lithium titanate spinel ($Li_4Ti_5O_{12}$), or titanium niobium oxide or titanium niobium tungsten oxide or titanium oxide. The current collector may be copper foil or nickel foil or titanium foil or aluminum foil, for example.

The battery also includes an electrolyte that may contact the positive electrode (cathode), the negative electrode (anode), and the separator. The electrolyte may include an organic solvent and a lithium salt. The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, methyl butyrate, dimethyl carbonate, diethyl carbonate, ethyl methyl carbonate, dipropyl carbonate, methylpropyl carbonate, propane sultone, or a combination thereof. In another aspect the electrolyte is a polymer electrolyte.

Representative lithium salts useful in an electrolyte include but are not limited to $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. A combination comprising at least one of the foregoing can be used. The concentration of the lithium salt can be 0.1 to 2.0 M in the electrolyte.

The electrolyte may be a solid ceramic electrolyte.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1: Preparation and Testing of $Li_{0.01}Mg_{0.01}Ni_{0.90}Co_{0.08}Y_{0.02}O_2$ A polycrystalline base material with overall composition $Li_{0.01}Mg_{0.01}Ni_{0.92}Co_{0.08}O_2$ was synthesized by standard solid-state synthesis techniques. 2.7 grams (g) yttrium nitrate hexahydrate ($Y(NO_3)_3.6H_2O$) (99.9% Alfa Aesar, Ward Hill, Mass.) was dissolved into 30 milliliters (ml) of 40° C. methanol in a glass beaker. Once dissolved, 35 grams (g) of polycrystalline base material ($Li_{0.01}Mg_{0.01}Ni_{0.92}Co_{0.08}O_2$) was added to the solution. The solution was stirred for 3 minutes to ensure the base was distributed in the methanol solution. The methanol was removed from the solution by evaporation on a rotary evaporator at 40 degrees Celsius (° C.) and 20 mmHg.

The dry powder was placed in an alumina crucible and calcined. Calcination was performed by heating at a rate of 5° C. per minute to about 130° C. and then holding at about 130° C. for about six hours. The temperature was then raised at about 5° C. per minute to about 450° C. and then holding for about 1 hour. The temperature was then raised at about 2° C. per minute to 700° C. and held at about 700° C. for two hours. The sample was then allowed to cool naturally to room temperature.

The material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Comparative Example 1

The polycrystalline base material ($Li_{0.01}Mg_{0.01}Ni_{0.92}Co_{0.08}O_2$) used above, without additional calcination, was used as a control material. An electrode with $Li_{0.01}Mg_{0.01}Ni_{0.92}Co_{0.08}O_2$ cathode powder control was prepared according to the method described in Example 1.

Figure 7:
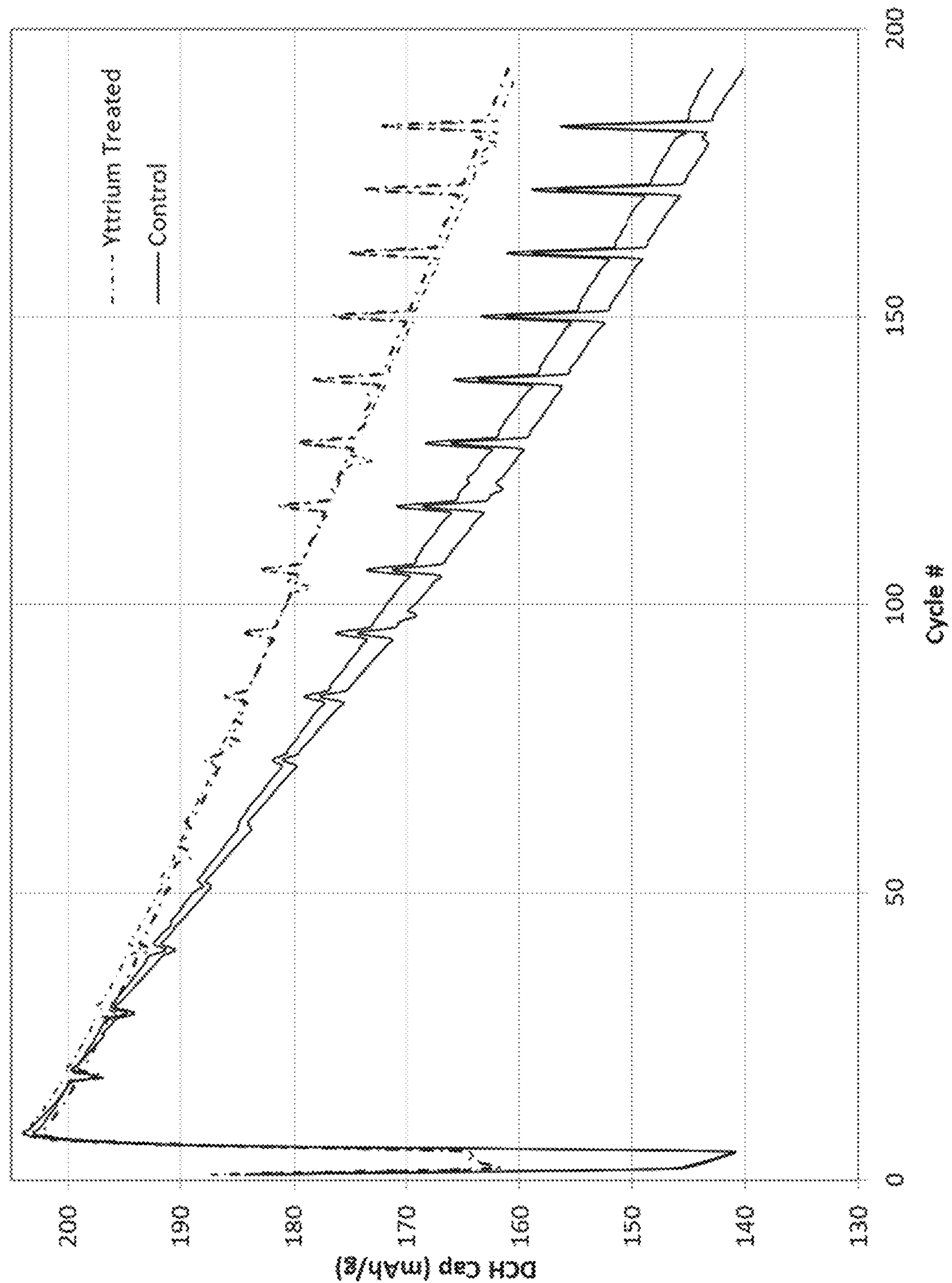
FIG. 7 illustrates discharge capacity as a function of cycle number for grain boundary-modified $LiMO_2$ material of Example 1 and its uniform-composition $LiMO_2$ precursor during cycling at 45° C. in full coin cells.
Figure 8:
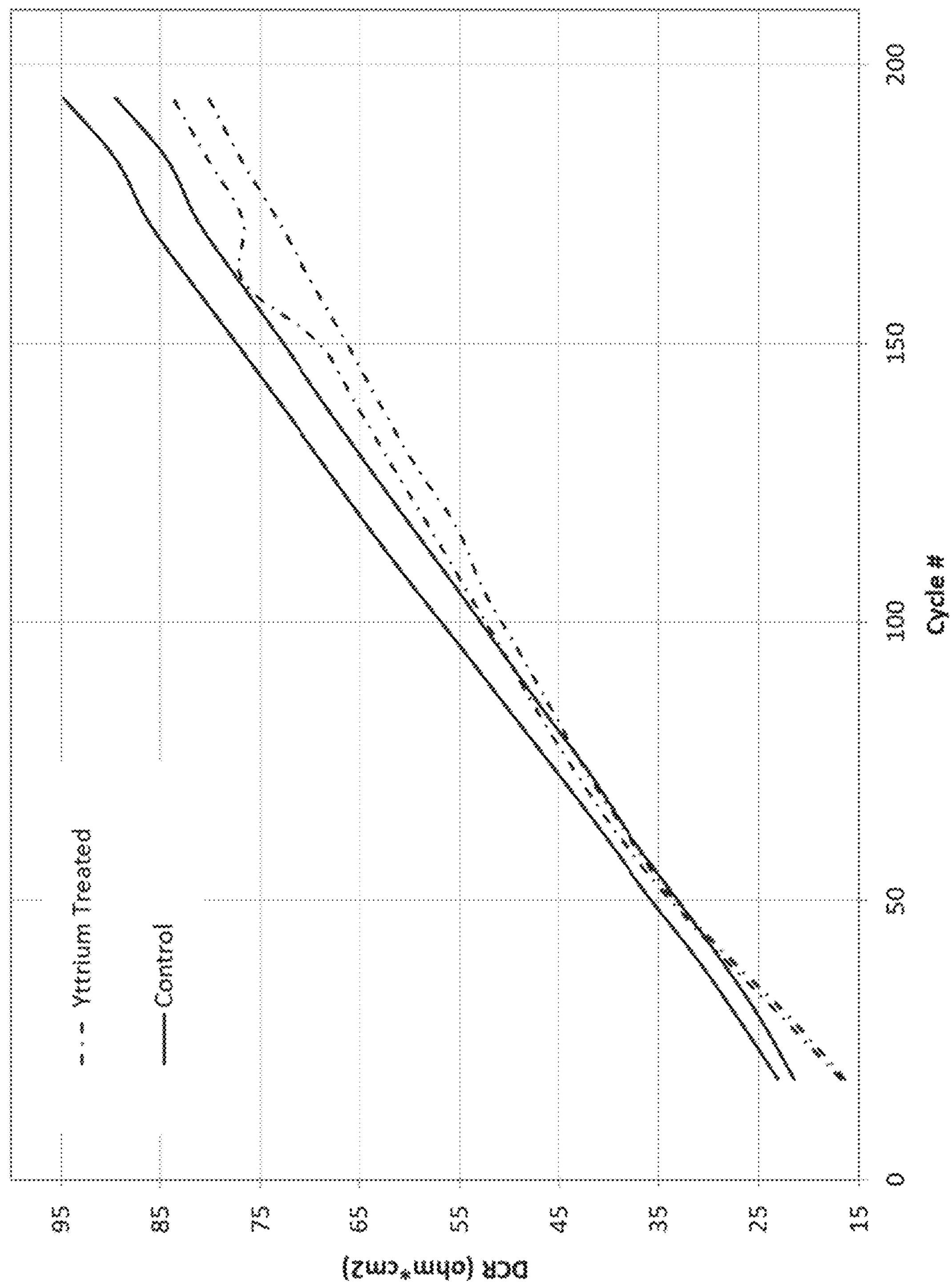
FIG. 8 illustrates a comparison of the impedance increase during cycle life measurement at 45° C. of materials as illustrated in FIG. 7 in full coin cells.

Table 3 shows the half-cell results for the Example 1 and Comparative example 1 electrodes tested between 4.3 Volts (V)-3.0 V, showing that treatment with yttrium does not significantly change the discharge capacity as measured in half cells. FIG. 7 and FIG. 8 show the full cell results of accelerated cycle life measurements carried out at 45° C. Material with yttrium exhibits more stable cycling and much reduced impedance increase compared to the base material. Presence of yttrium in the grain boundary region enhances lithium retention at the end of charge, and thereby reduces the damage to the material resulting in improved cycle life at 45° C. Capacity retention and rate of impedance growth during accelerated cycle life testing at 45° C. are shown in FIG. 7 and FIG. 8, respectively.

TABLE 3

Electrochemical capacity (mAh/g) of powders prepared in Example 1

| Sample | C/20 CGH | C/20 DCH | C/10 | C/5 | C/2 | 1 C | 2 C | 3 C | 5 C |
|---|---|---|---|---|---|---|---|---|---|
| Yttrium Treated | 232 | 215 | 210 | 205 | 196 | 190 | 185 | 182 | 178 |
| Control | 236 | 216 | 212 | 206 | 197 | 192 | 187 | 184 | 179 |

[1] Cells were charged to 4.3 V versus Li and discharged to 3.0 V, at the rates indicated in the top row.
The capacities are normalized to mass of active material in the electrode.

Example 2: Preparation and Testing of $Li_{0.01}Mg_{0.01}Ni_{0.87}Co_{0.11}Fe_{0.02}O_2$ 0.61 g iron acetate ($Fe(C_2H_3O_2)_2$) (Alfa Aesar, Ward Hill, Mass.) and 3.08 g cobalt nitrate hexahydrate ($Co(NO_3)_2.6H_2O$) were dissolved into 30 ml of 40° C. methanol in a glass beaker. Once dissolved, 35 g of Base ($Li_{1.01}Ni_{0.92}Co_{0.08}Mg_{0.01}O_2$) was added to the solution. The solution was stirred for 3 minutes to ensure the base was distributed in the methanol solution. The methanol was removed from the solution by evaporation on a rotary evaporator at 40° C. and 20 mmHg.

The dry powder was placed in an alumina crucible and calcined. Calcination was performed by heating at a rate of 5° C. per minute to about 130° C., and held at about 130° C. for about six hours. The temperature was then raised at about 5° C. per minute to about 450° C., and held for about 1 hour. The temperature was then raised at about 2° C. per minute to 700° C. and held at about 700° C. for two hours. The sample was then allowed to cool naturally to room temperature.

Figure 9:
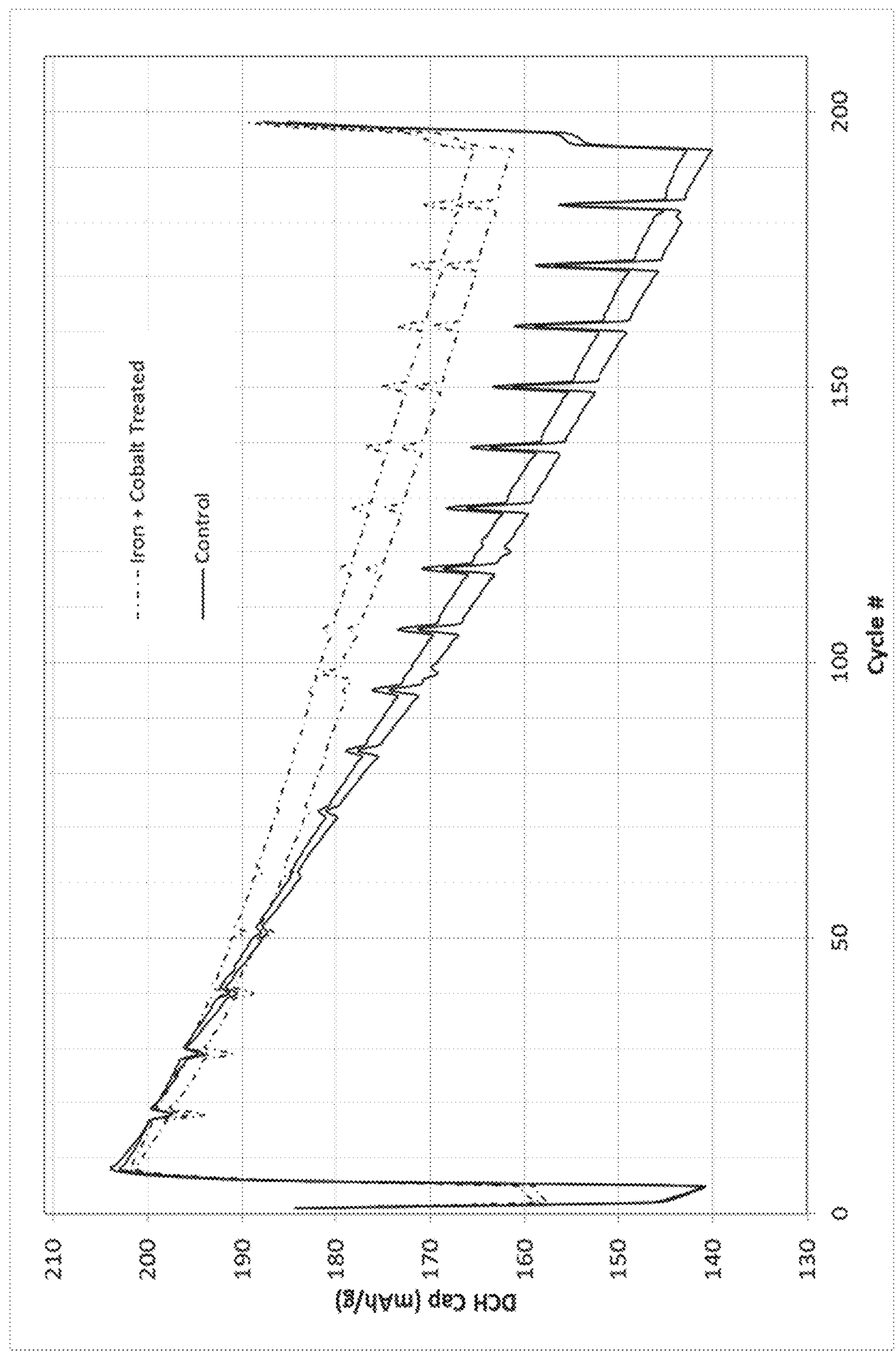
FIG. 9 illustrates discharge capacity as a function of cycle number for grain boundary-modified $LiMO_2$ material of Example 2 and its uniform-composition $LiMO_2$ precursor during cycling at 45° C. in full coin cells.
Figure 10:
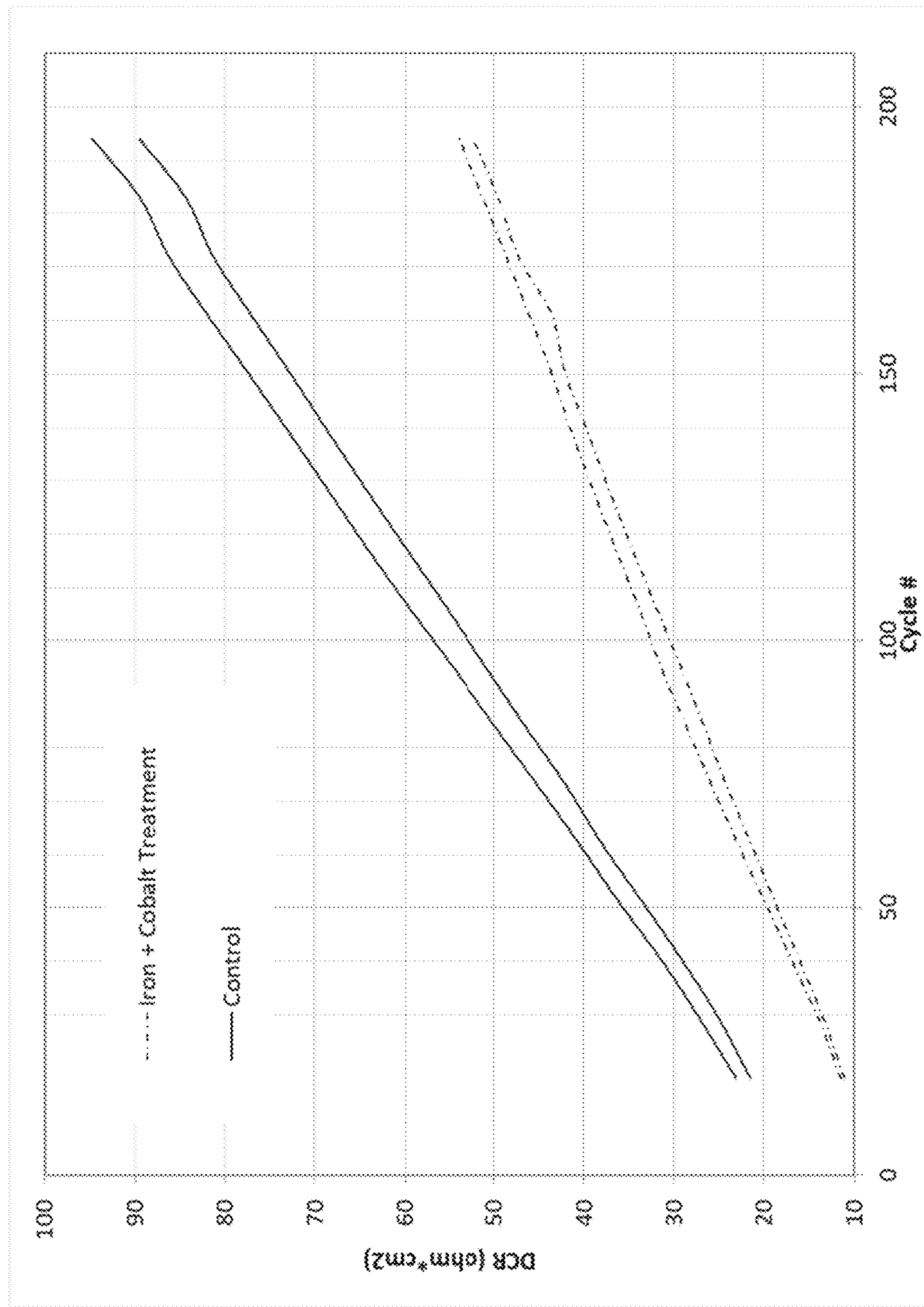
FIG. 10 illustrates a comparison of the impedance increase during cycle life measurement at 45° C. of materials as illustrated in FIG. 9 in full coin cells.

$Li_{0.01}Mg_{0.01}Ni_{0.87}Co_{0.11}Fe_{0.02}O_2$ cathode material was electrochemically tested along with the untreated base material control with $Li_{1.01}Ni_{0.92}Co_{0.08}Mg_{0.01}O_2$ composition in full coin cells opposite a graphite anode, 1M $LiPF_6$ in 1:1:1 EC:DMC:EMC with 1% VC (EDEV1) electrolyte, and a polymer separator. Full coin cells were cycled between 2.7 and 4.2 V at 45° C. using accelerated charge and discharge rates. FIG. 9 and FIG. 10 show the rate of capacity fade and impedance increase, respectively, during the accelerated cycle life testing.

Example 3: Preparation of $Li_{0.01}Mg_{0.01}Ni_{0.8975}Co_{0.0897}Mn_{0.0128}O_2$ To enable higher levels of Li in the grain boundary at 4.3V charge, a coating with 1/1/1 Ni/Co/Mn composition was formulated for grain boundary enrichment. A $LiMO_2$ material with this composition is expected to have 37% of the lithium retained when it is charged to 4.3V vs. Li. The base material used was $Li_{1.01}Mg_{0.01}Ni_{0.92}Co_{0.08}O_2$. To this was applied a 4% grain boundary-enrichment formulation of 1/1/1 Ni/Co/Mn composition. As such, 1.33% of each Ni, Co and Mn were formulated relative to total transition metal content of the base.

A solution of 200 ml water was made with manganese nitrate tetrahydrate (6.78 g), nickel nitrate heptahydrate (8.34 g), cobalt nitrate hexahydrate (7.86 g) and lithium nitrate (2.85 g) and was heated to 60° C. To this was added 200 g of the base material and the dispersion was stirred for two minutes. The dispersion was then spray dried to generate a free-flowing powder. This powder was then calcined at 700° C. for two hours (NCM111 enriched—sample 1) and at 715° C. for 0.25 hours (NCM111 enriched—sample 2) under a flow of $CO_2$-free air.

The samples were then characterized for residual LiOH and average oxidation state and compared to the base material. Reduction in residual LiOH while maintaining oxidation state is a strong indication that well-ordered materials were made. In addition, separate phases of $LiMO_2$ material with NCM111 composition were not detected in the XRD spectrum, also suggesting that the coating composition enriched the grain boundary (GB) region rather than forming a separate NCM111 $LiMO_2$ phase

TABLE 4

Summary of physico-chemical characterization of materials prepared with grain boundary region having the composition $LiNiCoMnCO_2$.

| Sample | Overall Composition | Wt % LiOH | Average Transition Metal Oxidation State |
|---|---|---|---|
| Base | $Li_{1.01}Mg_{0.01}Ni_{0.92}Co_{0.08}O_2$ | 0.100 | 2.95 |
| NCM111 enriched-sample 1 | $Li_{1.01}Mg_{0.01}Ni_{0.8975}Co_{0.0897}Mn_{0.0128}O_2$ | 0.066 | 2.93 |
| NCM111 enriched-sample 2 | $Li_{1.01}Mg_{0.01}Ni_{0.8975}Co_{0.0897}Mn_{0.0128}O_2$ | 0.069 | 2.94 |

Example 4: Preparation of $Li_{1.01}Mg_{0.01}Ni_{0.8975}Co_{0.0769}Al_{0.0128}Mn_{0.0128}O_2$ A polycrystalline base cathode material with overall composition $Li_{0.01}Mg_{0.01}Ni_{0.92}Co_{0.08}O_2$ (base material) was synthesized by standard solid-state synthesis techniques.

The grain boundaries of base material were then fortified with elements which, in combination with nickel, still form a layered 2D α-$NaFeO_2$ structure, but which exhibit a significantly reduced degree of oxidation at 4.3V. Incorporation of these elements, specifically Al and Mn demonstrated promotion of Li retention. The overall composition of this Al and Mn-grain-boundary-enriched material (referred to as NAM111 enriched) was $Li_{0.01}Mg_{0.01}Ni_{0.8975}Co_{0.0769}Al_{0.0128}Mn_{0.0128}O_2$. The material was synthesized according to the following procedure.

A solution of 100 ml water was made with manganese nitrate tetrahydrate (3.38 g), nickel nitrate heptahydrate (3.92 g), aluminum nitrate nonahydrate (5.05 g) and lithium nitrate (1.42 g) and was heated to 60° C. To this was added 100 g of the base material and the dispersion was stirred for 20 minutes. The dispersion was then spray dried to generate a free-flowing powder. This powder was then calcined at 700° C. for two hours (NAM111 enriched) under a flow of $CO_2$-free air.

Figure 3:
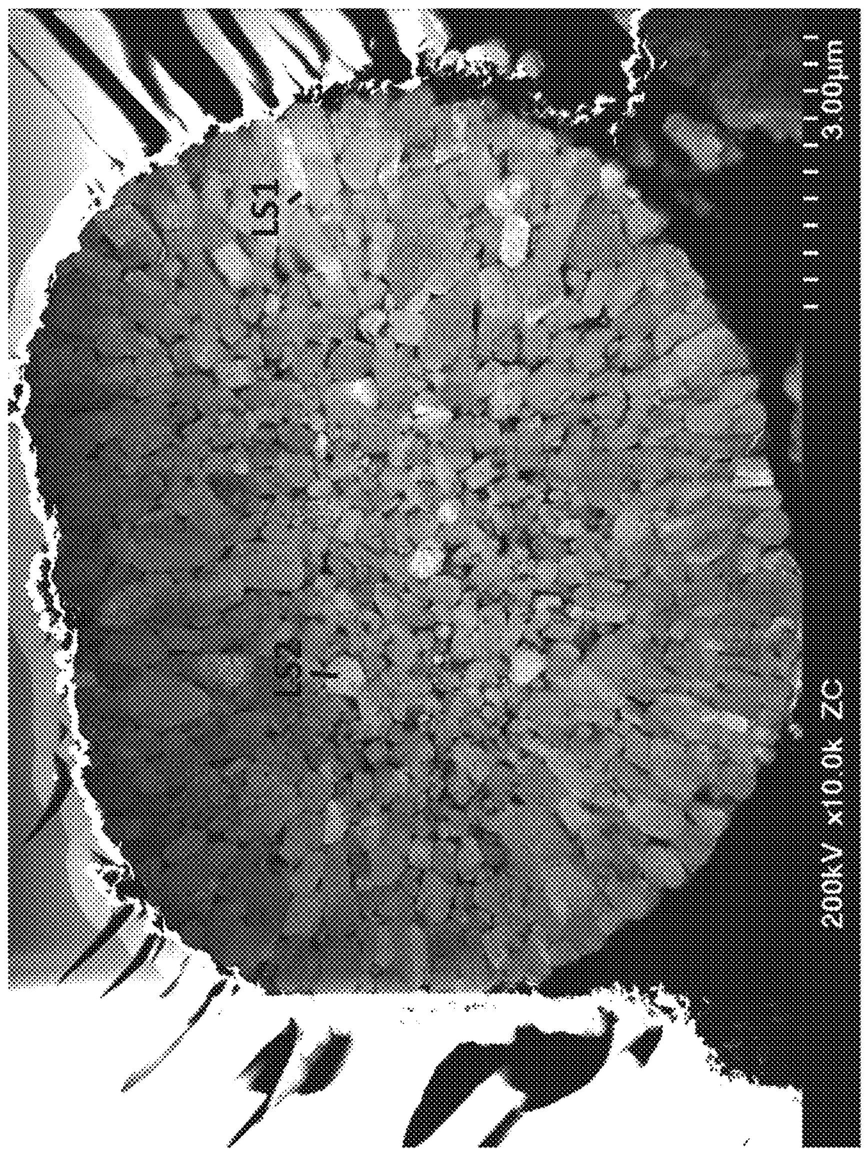
FIG. 3 shows the locations of EDS line scans in a thin lamella prepared from a particle of grain boundary-modified $LiMO_2$ material of Example 4.
Figure 4:
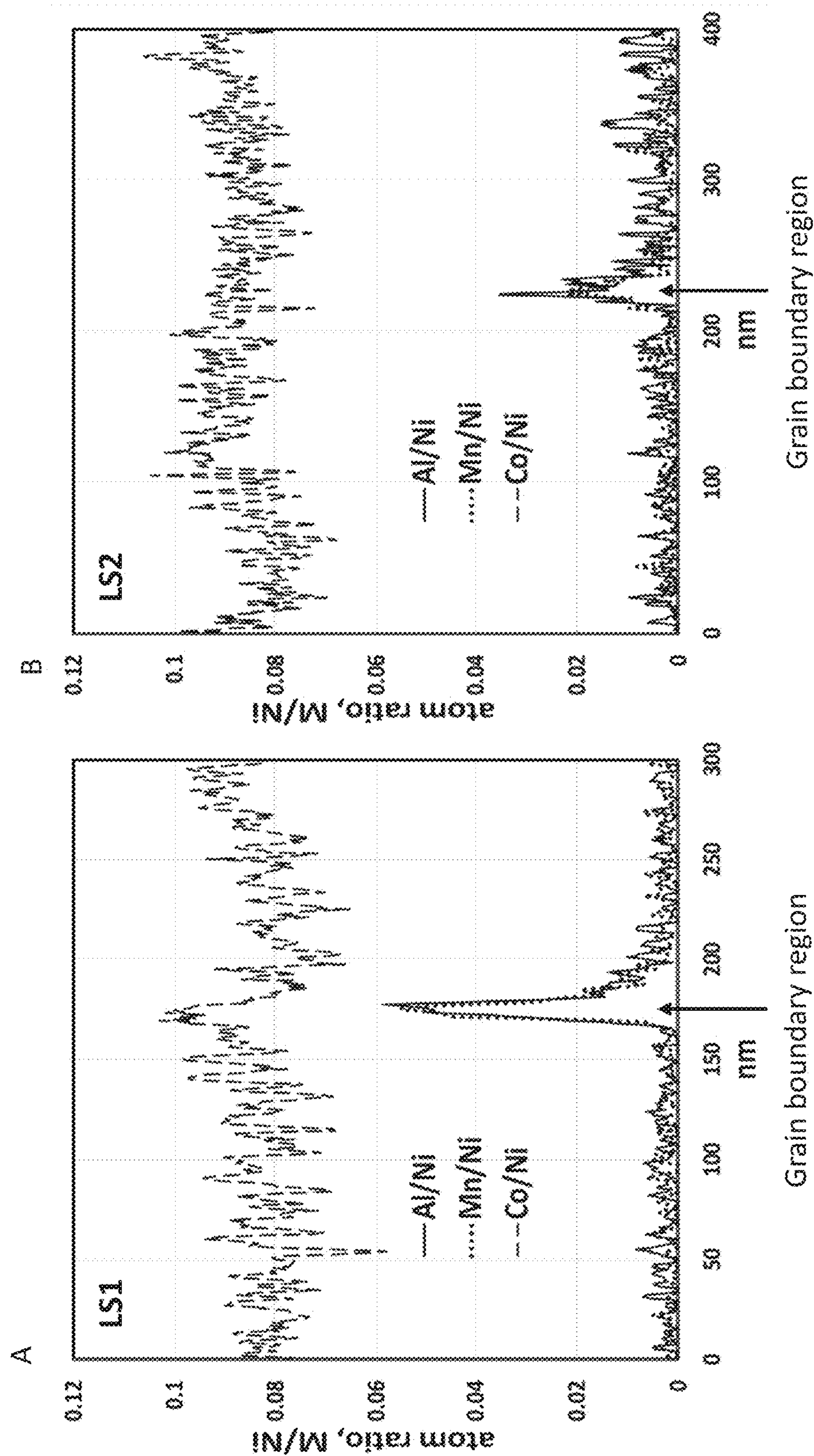
FIG. 4 shows results of EDS line scans in a thin lamella prepared from a particle of grain boundary-modified $LiMO_2$ material of Example 4 with A representative of the LS1 scan line of FIG. 3, and B representative of the LS2 scan line of FIG. 3.

The polycrystalline cathode material, NAM111 enriched, was then analyzed to confirm that the grain boundaries were indeed enriched in Al and Mn. A 100 nm thick section of the polycrystalline particle of NAM111 enriched was prepared using focused ion beam milling. EDS line scans were performed across two different grain boundaries at the indicated locations in FIG. 3. FIG. 4 shows the atomic ratios of aluminum, manganese and cobalt relative to nickel across these grain boundaries. As can be seen, there is clear enrichment of aluminum and manganese at these grain boundaries, but not cobalt. That is, the concentration of manganese at the grain boundaries is higher than the concentration of manganese in the crystallites. Also, the concentration of aluminum in the grain boundaries is higher than the concentration of aluminum in the crystallites.

Example 5: Preparation of $Li_{0.01}Mg_{0.01}Ni_{0.9038}Co_{0.0769}Mn_{0.0192}O_2$ Using the same polycrystalline base cathode material with overall composition $Li_{0.01}Mg_{0.01}Ni_{0.92}Co_{0.08}O_2$ (base material) of Example 3 and 4 was used for the synthesis of the Ni and Mn grain boundary enriched material (referred to as NM11 Enriched), with an overall final composition of $Li_{0.01}Mg_{0.01}Ni_{0.9038}Co_{0.0769}Mn_{0.0192}O_2$. The material was synthesized according to the following procedure.

A solution of 100 ml water was made with manganese nitrate tetrahydrate (5.90 g), nickel nitrate heptahydrate (5.09 g), and lithium nitrate (1.42 g) and was heated to 60° C. To this was added 100 g of the base material and the dispersion was stirred for 10 minutes. The dispersion was then spray dried to generate a free-flowing powder. This powder was then calcined at 700° C. for two hours under a flow of $CO_2$-free air.

Example 6: Electrochemical Testing of NMC111, NAM111, and NM11 Grain Boundary Enriched Materials Cathode electrodes with NCM111 enriched—sample 1 described in Example 3, Base Material and NAM111 Enriched material described in Example 4, and NM11 Enriched Material of Example 5 were prepared and electrochemically tested. Cathode active materials were first mixed with PVdF binder, conductive carbon, and NMP solvent to prepare an electrode slurry. The electrode slurry was coated onto aluminum foil using a draw down table. The coated foil was dried at 130° C. to drive off the NMP leaving behind a coated electrode. The electrode was then pressed, punched, and assembled into coin cells with Li metal anode (half cells) or with graphite anode (full cells), and tested.

Figure 11:
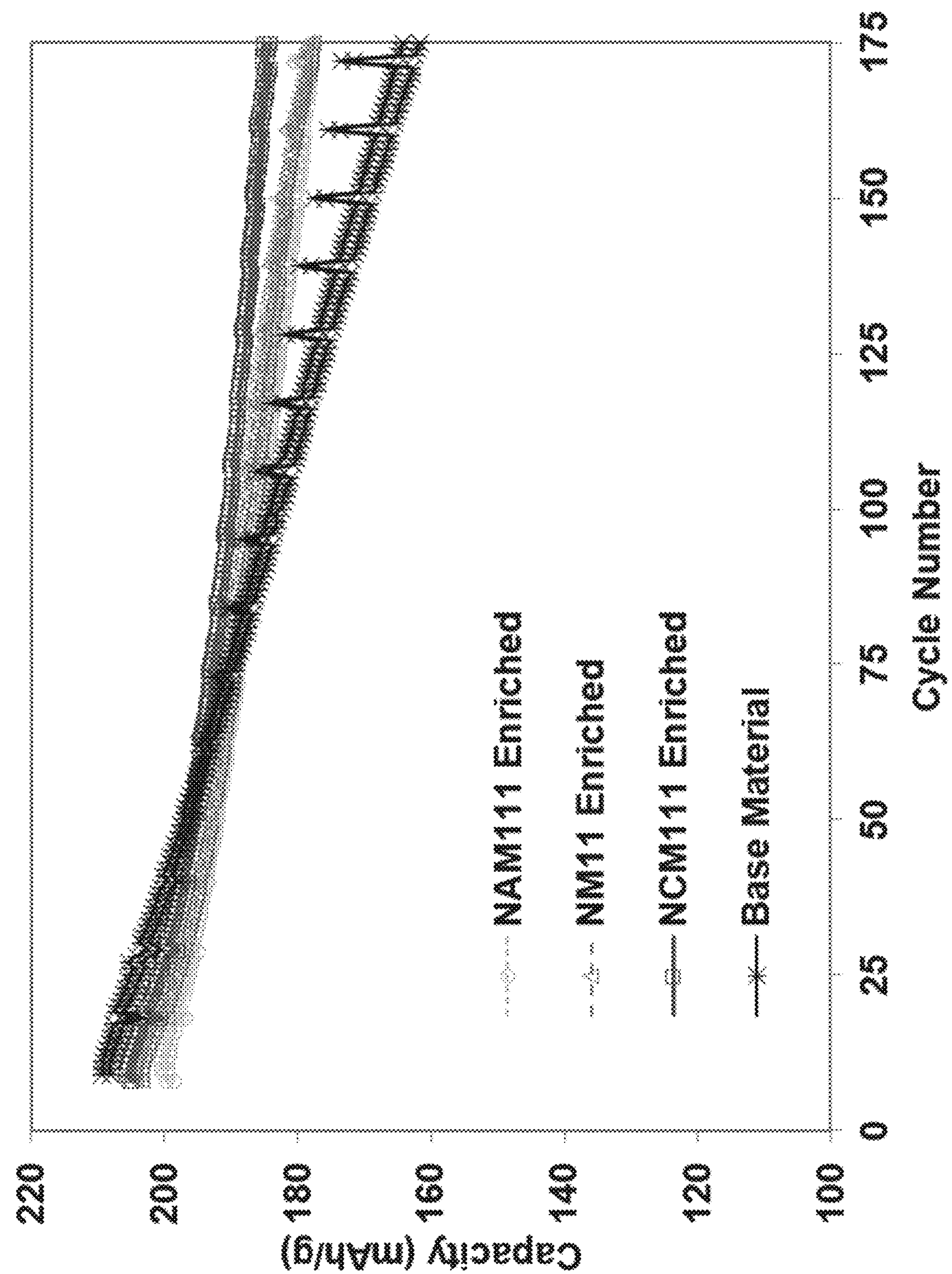
FIG. 11 illustrates discharge capacity as a function of cycle number for grain boundary-modified $LiMO_2$ material of Examples 3-5 and its uniform-composition $LiMO_2$ precursor during cycling at 45° C. in full coin cells.
Figure 12:
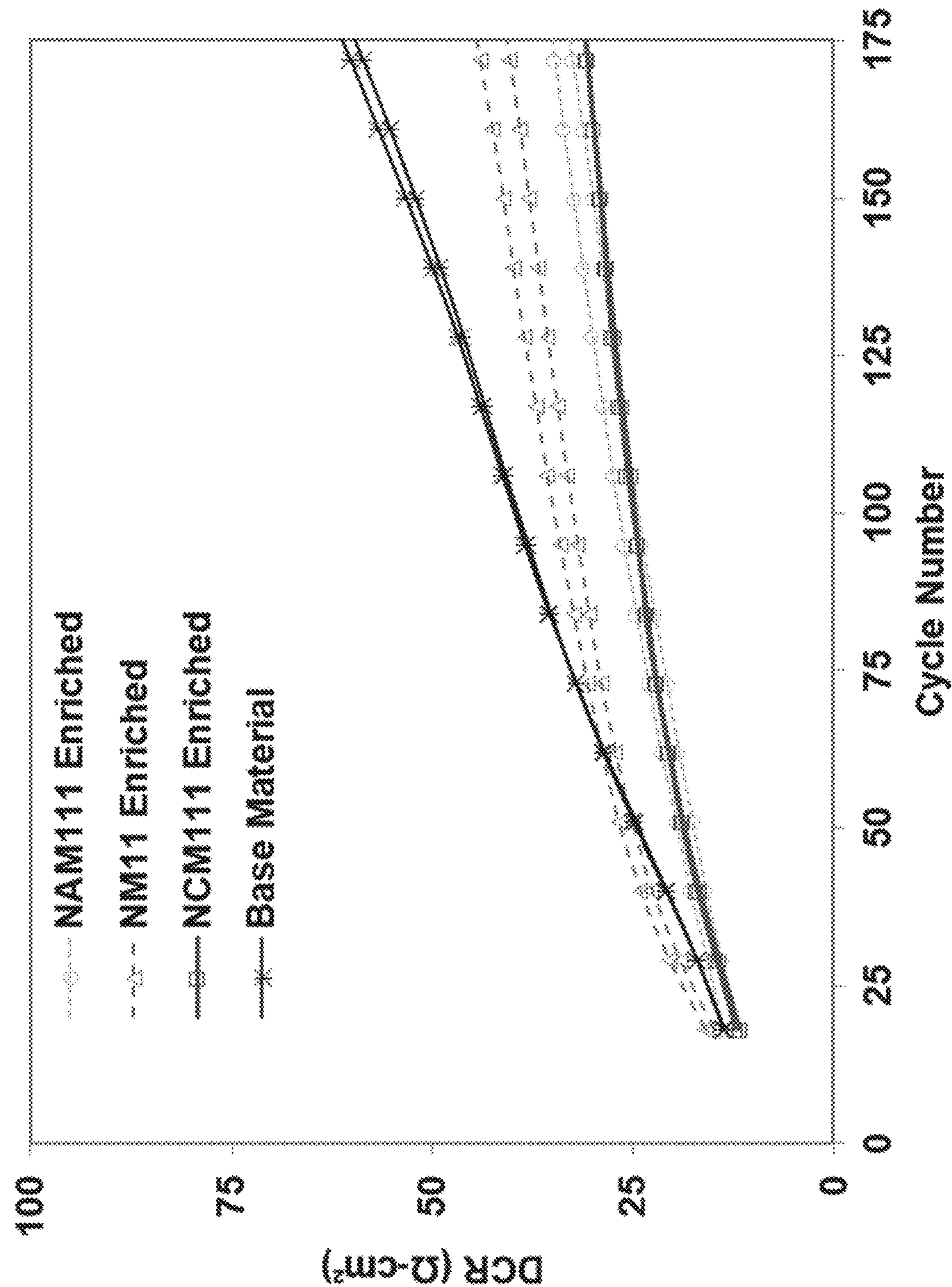
FIG. 12 illustrates a comparison of the impedance increase during cycle life measurement at 45° C. of materials as illustrated in FIG. 11 in full coin cells.

Cycle life of the three materials in full coin cells was tested using identical electrochemical procedures. FIGS. 11 and 12 show capacity retention and impedance growth, respectively, during accelerated cycle life testing at 45° C. In addition to high rate cycle steps, a 1C continuous discharge step is included after every 10 high rate cycles. FIG. 12 shows DCR measured with a 10 second, 2C pulse at the end of charge after every 10 high rate cycles. The superior performance of the grain boundary enriched materials both in terms of reduced capacity fade and reduced impedance growth is confirmed by these measurements. The selective enrichment of Al and Mn at the grain boundary promotes additional retention of Li at the end of charge.

Example 7: XRD Analysis of the Charged Grain Boundary-Enriched Materials

Figure 5:
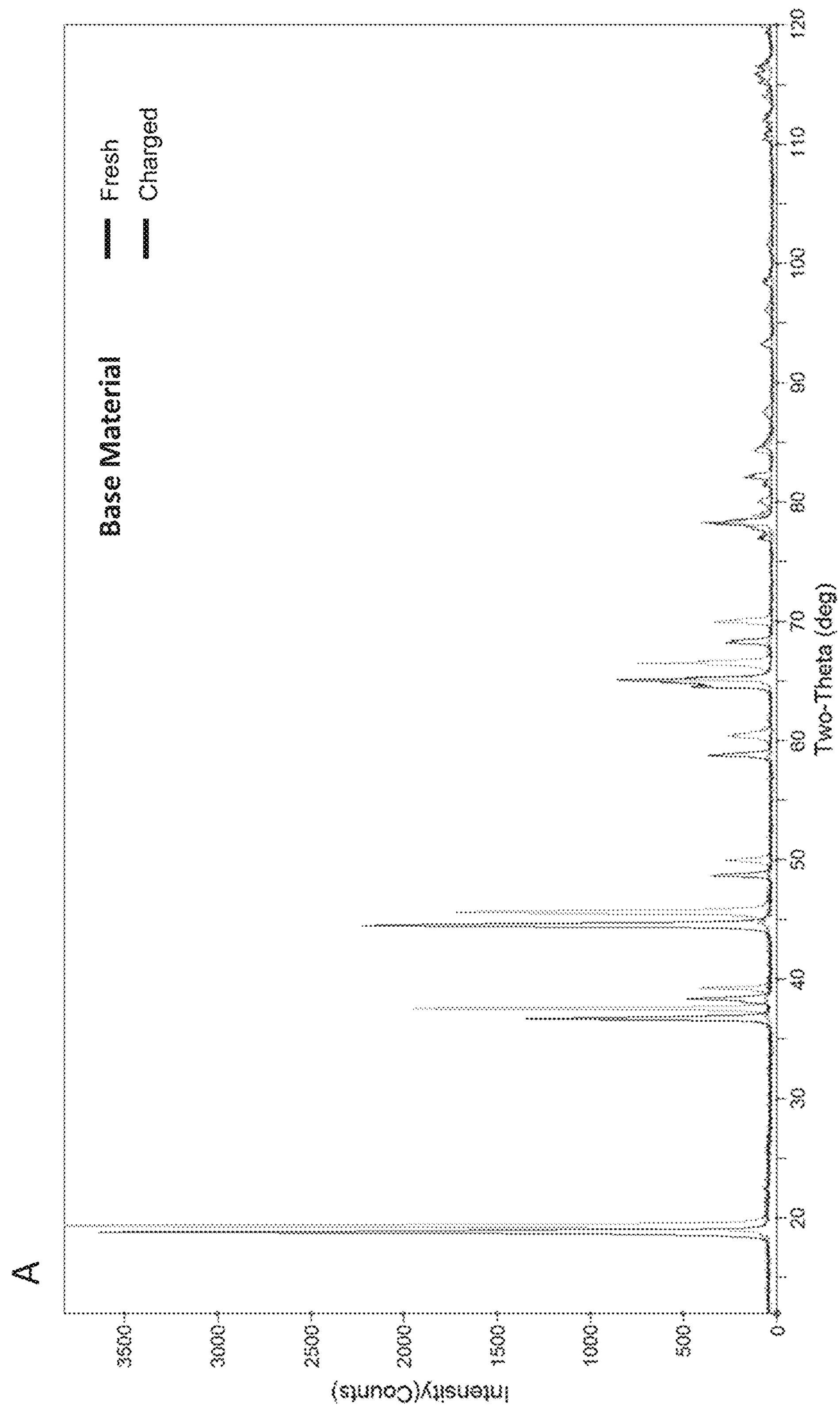
FIG. 5 shows XRD results for the charged and fresh cathode electrodes of the grain boundary-modified $LiMO_2$ material of Example 3 and its uniform-composition $LiMO_2$ base.

FIG. 5 shows x-ray diffraction data for the homogeneous $Li_{0.01}Mg_{0.01}Ni_{0.92}Co_{0.08}O_2$ base material and NCM111 grain boundary enriched material of Example 3 with the overall composition of $Li_{0.01}Mg_{0.01}Ni_{0.8975}Co_{0.0897}Mn_{0.0128}O_2$ (Sample 1). Cathode electrodes coated on Al current collectors were X-rayed either fresh or charged to 4.3V vs. Li. Electrodes were charged in coin cells opposite a Li metal counter electrode. Charged electrodes were harvested, washed, and dried prior to x-ray diffraction. X-ray diffraction spectra were collected using a continuous scan between 12 and 120 degrees in 2-theta at 0.75 degrees/min using an automated Shimadzu XRD-6000 diffractometer with a Cu X-ray tube. The two cathode materials have essentially identical diffractograms, and many of the peaks for both materials shift to significantly higher 2θ values when they are charged.

Figure 6:
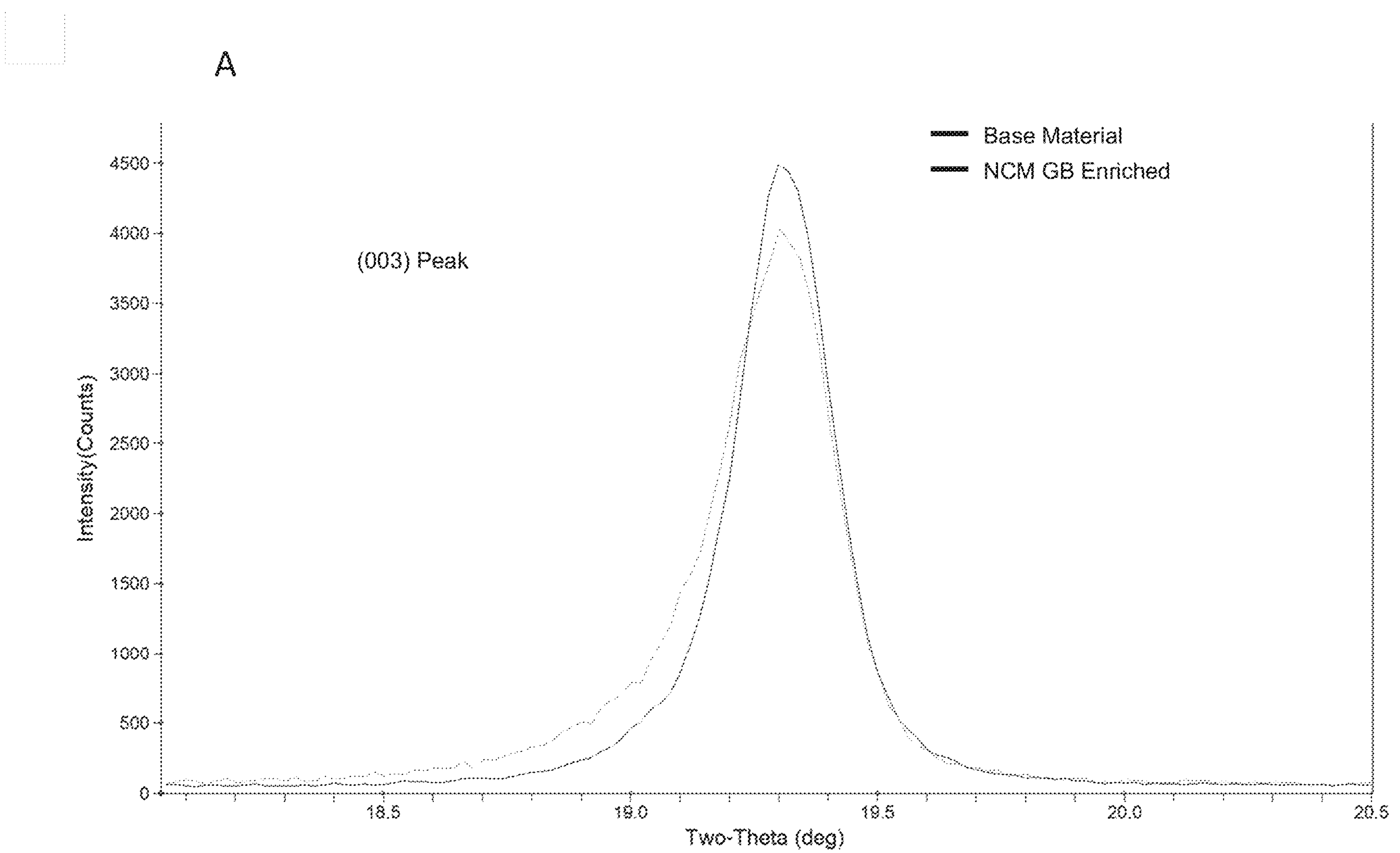
FIG. 6 shows high resolution XRD results for the charged electrodes of the grain boundary-modified $LiMO_2$ material of Example 3 and its uniform-composition $LiMO_2$ base with peak position offset and scaled to the (104) peak.

However, comparing the XRD of the two charged materials reveals an important difference. The 2θ=19° and 46° peaks on the charged grain boundary-modified $Li_{0.01}Mg_{0.01}Ni_{0.8975}Co_{0.0897}Mn_{0.0128}O_2$ cathode are broader and have a shoulder at low 2θ compared to those for the homogeneous $Li_{0.01}Mg_{0.01}Ni_{0.92}Co_{0.08}O_2$ cathode, as shown in FIG. 6.

The 2θ=19° and 46° peaks in the $LiMO_2$ XRD are associated with the 003 and the 104 crystallographic orientations for the 2D α-$NaFeO_2$ crystal structure, respectively, and are most directly impacted by c-axis inhomogeneity arising from Li distribution inhomogeneity. Therefore, the low 2θ shoulder for the charged grain boundary-modified $Li_{0.01}Mg_{0.01}Ni_{0.8975}Co_{0.0897}Mn_{0.0128}O_2$ cathode in FIG. 6 is an indication that it retains more Li in its grain boundaries than in its bulk crystallites when it is charged.

Example 8: Preparation of $Li_{0.01}Mg_{0.01}Ni_{0.90}Co_{0.08}Nd_{0.02}O_2$ A polycrystalline grain boundary enriched material with overall composition of $Li_{0.01}Mg_{0.01}Ni_{0.90}Co_{0.08}Nd_{0.02}O_2$ was synthesized as follows: 2.7 grams (g) neodymium nitrate hexahydrate ($Nd(NO_3)_3.6H_2O$) (99.9% Sigma Aldrich Milwaukee, Wis.) was dissolved into 30 milliliters (ml) of 40° C. methanol in a glass beaker. Once dissolved, 30 grams (g) of polycrystalline base material ($Li_{0.01}Mg_{0.01}Ni_{0.92}Co_{0.08}O_2$) was added to the solution. The solution was stirred for 3 minutes to ensure the base was distributed in the methanol solution. The methanol was removed from the solution by evaporation on a rotary evaporator at 40 degrees Celsius (° C.) and 20 mmHg.

The dry powder was placed in an alumina crucible and calcined. Calcination was performed by heating at a rate of 5° C. per minute to about 130° C. and then holding at about 130° C. for about six hours. The temperature was then raised at about 5° C. per minute to about 450° C. and then holding for about 1 hour. The temperature was then raised at about 2° C. per minute to 700° C. and held at about 700° C. for two hours. The sample was then allowed to cool naturally to room temperature.

Example 9: Preparation of $Li_{0.01}Mg_{0.01}Ni_{0.90}Co_{0.08}Ga_{0.02}O_2$ A polycrystalline grain boundary enriched material with overall composition of $Li_{0.01}Mg_{0.01}Ni_{0.90}Co_{0.08}Ga_{0.02}O_2$ was synthesized as follows: 1.55 grams (g) gallium nitrate hydrate ($Ga(NO_3)_3.H_2O$) (99.999% Sigma Aldrich Milwaukee, Wis.) was dissolved into 30 milliliters (ml) of 40° C. ethanol in a glass beaker. Once dissolved, 30 grams (g) of polycrystalline base material ($Li_{0.01}Mg_{0.01}Ni_{0.92}Co_{0.08}O_2$) was added to the solution. The solution was stirred for 3 minutes to ensure the base was distributed in the methanol solution. The methanol was removed from the solution by evaporation on a rotary evaporator at 40 degrees Celsius (° C.) and 20 mmHg.

The dry powder was placed in an alumina crucible and calcined. Calcination was performed by heating at a rate of 5° C. per minute to about 130° C. and then holding at about 130° C. for about six hours. The temperature was then raised at about 5° C. per minute to about 450° C. and held there for about 1 hour. The temperature was then raised at about 2° C. per minute to 700° C. and held at about 700° C. for two hours. The sample was then allowed to cool naturally to room temperature.

Example 10: Preparation of $Li_{1.01}Mg_{0.01}Ni_{0.90}Co_{0.08}B_{0.02}O_2$ A polycrystalline grain boundary enriched material with overall composition of $Li_{0.01}Mg_{0.01}Ni_{0.90}Co_{0.08}B_{0.02}O_2$ was synthesized as follows: 0.21 grams (g) boron trioxide ($B_2O_3$) (99% Sigma Aldrich Milwaukee, Wis.) was dissolved into 40 milliliters (ml) of 40° C. methanol in a glass beaker. Once dissolved, 30 grams (g) of polycrystalline base material ($Li_{0.01}Mg_{0.01}Ni_{0.92}Co_{0.08}O_2$) was added to the solution. The solution was stirred for 3 minutes to ensure the base was distributed in the methanol solution. The methanol was removed from the solution by evaporation on a rotary evaporator at 40 degrees Celsius (° C.) and 20 mmHg.

The dry powder was placed in an alumina crucible and calcined. Calcination was performed by heating at a rate of 5° C. per minute to about 130° C. and then holding at about 130° C. for about six hours. The temperature was then raised at about 5° C. per minute to about 450° C. and then held there for about 1 hour. The temperature was then raised at about 2° C. per minute to 700° C. and held at about 700° C. for two hours. The sample was then allowed to cool naturally to room temperature.

Example 11: Preparation of $Li_{0.01}Mg_{0.01}Ni_{0.90}Co_{0.08}Fe_{0.02}O_2$ A grain boundary enriched material with overall composition of $Li_{0.01}Mg_{0.01}Ni_{0.90}Co_{0.08}Fe_{0.02}O_2$ was synthesized as follows: 1.23 grams (g) iron acetate anhydrous ($Fe(OOCH_3)_2$) (99.9% Alfa Aesar, Ward Hill, Mass.) was dissolved into 30 milliliters (ml) of 40° C. methanol in a glass beaker. Once dissolved, 35 grams (g) of polycrystalline base material ($Li_{0.01}Mg_{0.01}Ni_{0.92}Co_{0.08}O_2$) was added to the solution. The solution was stirred for 3 minutes to ensure the base was distributed in the methanol solution. The methanol was removed from the solution by evaporation on a rotary evaporator at 40 degrees Celsius (° C.) and 20 mmHg.

The dry powder was placed in an alumina crucible and calcined. Calcination was performed by heating at a rate of 5° C. per minute to about 130° C. and then holding at about 130° C. for about six hours. The temperature was then raised at about 5° C. per minute to about 450° C. and then holding for about 1 hour. The temperature was then raised at about 2° C. per minute to 700° C. and held at about 700° C. for two hours. The sample was then allowed to cool naturally to room temperature.

Example 12: Electrochemical Testing of Cathode Materials of Examples 1 and 8 to 11

Cathode active materials of Example 1, 8, 9, 10, and 11 were formulated into cathode electrodes. Materials were first mixed with PVdF, conductive carbon, and NMP solvent to prepare an electrode slurry. Electrode slurries were then coated on to aluminum foil using a doctor blade approach. The coated foils were dried at 130° C. to drive off the NMP leaving behind coated electrodes. Electrodes were then pressed, punched, and assembled into coin cells with Li metal counter electrodes, polymer separator, and carbonate electrolyte. Half cells were then tested for capacity and rate capability (charged to 4.3V and discharged to 3.0V). Electrochemical performance data for the enriched materials and the un-enriched polycrystalline base material are shown in Table 5.

TABLE 5

Electrochemical performance of materials described in Examples 1, 8, 9, 10, and 11. Capacity normalized by the weight of active material.

| Example | 1st C/20 Charge (mAh/g) | Discharge Capacity (mAh/g) C/20 | C/5 | 5 C |
|---|---|---|---|---|
| $Li_{1.01}Mg_{0.01}Ni_{0.90}Co_{0.08}Y_{0.02}O_2$ | 233 | 213 | 202 | 176 |
| $Li_{1.01}Mg_{0.01}Ni_{0.90}Co_{0.08}Nd_{0.02}O_2$ | 230 | 219 | 209 | 178 |
| $Li_{1.01}Mg_{0.01}Ni_{0.90}Co_{0.08}Ga_{0.02}O_2$ | 239 | 213 | 205 | 180 |
| $Li_{1.01}Mg_{0.01}Ni_{0.90}Co_{0.08}B_{0.02}O_2$ | 246 | 232 | 221 | 188 |
| $Li_{1.01}Mg_{0.01}Ni_{0.90}Co_{0.08}Fe_{0.02}O_2$ | 231 | 197 | 187 | 158 |
| $Li_{1.01}Mg_{0.01}Ni_{0.90}Co_{0.08}O_2$ | 236 | 213 | 206 | 179 |

Without being limited by one particular theory, it is believed the superior cycling stability of materials with modified grain boundaries is related to their selective retention of more Li in grain boundaries when they are charged, as can be inferred from the preceding examples.

The foregoing description of particular aspect(s) is merely exemplary in nature and is in no way intended to limit the scope of the disclosure, its application or uses, which may of course vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, unless specified otherwise, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications, in addition to those shown and described herein, will be apparent to those skilled in the art of the above description. Such modifications are also intended to fall within the scope of the disclosure.

It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

The invention claimed is:

1. An electrochemically active particle for use in a cathode of an electrochemical cell, the particle comprising:

a plurality of crystallites comprising a first composition comprising lithium, nickel, and oxygen;

a grain boundary between adjacent crystallites of the plurality of crystallites and comprising a second composition comprising lithium, nickel, and oxygen;

wherein lithium is present in the grain boundary at a higher concentration than lithium in the crystallites when an electrode incorporating the particle is charged, and wherein the grain boundary has higher electrochemical affinity for Li than the crystallites.

2. The particle of claim 1 wherein lithium is present in the grain boundary at a higher concentration than lithium in the crystallites when the electrode is charged to a potential greater than or equal to 3.5 V versus lithium.

3. The particle of claim 1 wherein lithium is present in the grain boundary at a higher concentration than lithium in the crystallites at a charge capacity of 40 mAh/g or greater.

4. The particle of claim 1 wherein the grain boundary comprises greater than 0.1 moles of lithium per mole of the second composition at said potential or said capacity.

5. The particle of claim 1 wherein the grain boundary comprises greater than 0.15 moles of lithium per mole of the second composition at said potential or said capacity.

6. The particle of claim 1 wherein the plurality of crystallites, the grain boundary or both, has an $\alpha$-$NaFeO_2$-type layered structure, a cubic structure, a spinel structure, a monoclinic structure, or a combination thereof.

7. The particle of claim 1 wherein the second composition is $Li_{1+x}M'O_{2+y}$, wherein M' comprises Ni, the amount of Ni on the basis of moles Ni per mole of M' in the second composition is $-0 \leq Ni \leq 0.99$.

8. The particle of claim 7 wherein amount of Ni on the basis of moles Ni per mole of M' of the second composition is 0.9 or less.

9. The particle of claim 7, wherein M' comprises an element having a higher oxidation potential than Ni.

10. The particle of claim 9 wherein the element is capable of substituting for Ni in the 3b site of the $Li_{1+x}M'O_{2+y}$ structure.

11. The particle of claim 7 wherein M' comprises element Mn, Ti, Cr, Fe, Y, Ga, Sb, W, Sc, Zr, Nb, Mo, Zn, Cu, In, Ge, Al, or any combination thereof, where the concentration of the element in the grain boundary is greater than the concentration of the element in the crystallites.

12. The particle of claim 7 wherein M' comprises two or more elements selected from the group consisting of Mn, Ti, Cr, Fe, Co, Y, Ga, Sb, W, Sc, Zr, Nb, Mo, Zn, Cu, In, Ge, and Al.

13. The particle of claim 7 wherein M' comprises three or more elements selected from the group consisting of Mn, Ti, Cr, Fe, Co, Y, Ga, Sb, W, Sc, Zr, Nb, Mo, Zn, Cu, In, Ge, and Al.

14. The particle of claim 1 wherein the first composition is defined by $Li_{1+x}MO_{2+y}$, wherein M comprises nickel at greater than or equal to 0.1 moles per mole M.

15. The particle of claim 14 wherein M comprises nickel at greater than or equal to 0.75 moles per mole M, optionally greater than or equal to 0.90 moles per mole M.

16. The particle of claim 15 wherein M further comprises an additional metal, wherein the additional metal is present in an amount of about 0.01 to about 0.90 moles per mole M;

the additional metal optionally selected from the group consisting of Mg, Sr, Co, Al, Ca, Cu, Zn, Mn, V, Ba, Zr, Ti, Cr, Fe, Mo, B, and any combination thereof.

17. The particle of claim 1, further comprising an outer coating on a surface of the particle, the outer coating comprising:

an oxide of one or more elements selected from Al, Zr, Y, Co, Ni, Mg, and Li;

a fluoride comprising one or more elements selected from Al, Zr, and Li;

a carbonate comprising one or more elements selected from Al, Co, Ni, Mn, and Li;

a sulfate comprising one or more elements selected from Al, Co, Ni, Mn, and Li; or a phosphate comprising one or more elements selected from Al and Li.

18. An electrochemically active particle for use in a cathode of an electrochemical cell, the particle comprising:

a plurality of crystallites comprising a first composition comprising lithium, nickel, and oxygen;

a grain boundary between adjacent crystallites of the plurality of crystallites and comprising a second composition comprising lithium, nickel, and oxygen;

wherein lithium is present in the grain boundary at a higher concentration than lithium inside the crystallites when the particle is at a state of charge greater than or equal to 10 percent; and wherein the grain boundary has higher electrochemical affinity for Li than the crystallites.

19. The particle of claim 18 wherein the lithium is present in the grain boundary at a higher concentration than lithium inside the crystallites when the particle is at a state of charge greater than or equal to 80 percent.

20. An electrochemical cell comprising a cathode, an anode, and an electrolyte, the cathode comprising a cathode active material comprising the particle of claim 1.

* * * * *